United States Patent
Moore et al.

(10) Patent No.: US 7,061,466 B1
(45) Date of Patent: Jun. 13, 2006

(54) FORCE FEEDBACK DEVICE INCLUDING SINGLE-PHASE, FIXED-COIL ACTUATORS

(75) Inventors: David F. Moore, Redwood City, CA (US); Bruce M. Schena, Menlo Park, CA (US); Erik J. Shahoian, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/565,207

(22) Filed: May 4, 2000

Related U.S. Application Data

(60) Provisional application No. 60/133,208, filed on May 7, 1999.

(51) Int. Cl.
  *G09G 5/00* (2006.01)

(52) U.S. Cl. .................. 345/156; 345/161; 345/163

(58) Field of Classification Search ........ 345/156–160, 345/161–169, 173; 200/6 A, 5 R, 176–178
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,160,508 A | 7/1979 | Frosch et al. | |
| 4,236,325 A | 12/1980 | Hall et al. | |
| 4,262,549 A | 4/1981 | Schwellenbach | |
| 4,333,070 A | 6/1982 | Barnes | |
| 4,464,117 A | 8/1984 | Forest | |
| 4,469,330 A * | 9/1984 | Asher | ........................... 463/38 |
| 4,484,191 A | 11/1984 | Vavra | |

(Continued)

FOREIGN PATENT DOCUMENTS

DE  19501439  9/1996

(Continued)

OTHER PUBLICATIONS

National Instruments, Types of Stepper Motors by Colin D. Simpson, 1996.*

(Continued)

*Primary Examiner*—Ricardo Osorio
*Assistant Examiner*—Mansour M. Said
(74) *Attorney, Agent, or Firm*—Kilpatrick Stockton LLP

(57) ABSTRACT

A force feedback interface device that provides force feedback to a joystick handle manipulated by a user. A force feedback device inputs control signals to a computer and outputs forces to a user of the force feedback device. The device includes a housing gripped by the user of the force feedback device and a joystick handle manipulable in at least two rotary degrees of freedom by the user, such as a gamepad. Sensors detect a position of the joystick handle and two direct drive actuators each provide torque in a rotary degree of freedom. Each of the actuators is a brushless, single phase actuator having a grounded excitation coil and a moving magnetic material. The joystick is mechanically constrained to not move past either of two limits where the torque output by the actuator in an unenergized state changes direction. The joystick handle can be oriented such that a center position is substantially at a local minimum reluctance position of the actuator, where the joystick is mechanically constrained to not move substantially past either local maximum reluctance position adjacent to the local minimum reluctance position. The local minimum reluctance position can in some embodiments provide a centering spring force on the joystick handle.

37 Claims, 13 Drawing Sheets

U.S. PATENT DOCUMENTS

| | | | |
|---|---|---|---|
| 4,513,235 A | | 4/1985 | Acklam et al. |
| 4,581,491 A | | 4/1986 | Boothroyd |
| 4,599,070 A | | 7/1986 | Hladky et al. |
| 4,708,656 A | | 11/1987 | De Vries et al. |
| 4,713,007 A | | 12/1987 | Alban |
| 4,786,768 A | * | 11/1988 | Langewis et al. ........... 200/6 A |
| 4,794,392 A | | 12/1988 | Selinko |
| 4,891,764 A | | 1/1990 | McIntosh |
| 4,930,770 A | | 6/1990 | Baker |
| 4,934,694 A | | 6/1990 | McIntosh |
| 4,958,071 A | * | 9/1990 | Scott-Jackson et al. ..... 250/229 |
| 4,985,652 A | | 1/1991 | Oudet et al. |
| 5,019,761 A | | 5/1991 | Kraft |
| 5,022,384 A | | 6/1991 | Freels |
| 5,022,407 A | | 6/1991 | Horch et al. |
| 5,035,242 A | | 7/1991 | Franklin |
| 5,038,089 A | | 8/1991 | Szakaly |
| 5,078,152 A | | 1/1992 | Bond |
| 5,136,194 A | | 8/1992 | Oudet et al. |
| 5,165,897 A | | 11/1992 | Johnson |
| 5,168,221 A | * | 12/1992 | Houston ..................... 324/207 |
| 5,175,459 A | | 12/1992 | Danial et al. |
| 5,185,561 A | * | 2/1993 | Good et al. ................. 318/432 |
| 5,186,695 A | | 2/1993 | Mangseth et al. |
| 5,212,473 A | | 5/1993 | Louis |
| 5,240,417 A | | 8/1993 | Smithson et al. |
| 5,271,290 A | | 12/1993 | Fischer |
| 5,275,174 A | | 1/1994 | Cook |
| 5,283,970 A | | 2/1994 | Aigner |
| 5,299,810 A | | 4/1994 | Pierce |
| 5,309,140 A | | 5/1994 | Everett |
| 5,334,027 A | | 8/1994 | Wherlock |
| 5,334,893 A | * | 8/1994 | Oudet et al. ................... 310/38 |
| 5,406,076 A | * | 4/1995 | Mimura et al. ............. 250/229 |
| 5,414,337 A | * | 5/1995 | Schuler ...................... 318/561 |
| 5,436,622 A | | 7/1995 | Gutman et al. |
| 5,437,607 A | | 8/1995 | Taylor |
| 5,466,213 A | | 11/1995 | Hogan |
| 5,532,585 A | | 7/1996 | Oudet et al. |
| 5,547,382 A | | 8/1996 | Yamasaki |
| 5,575,761 A | | 11/1996 | Hajianpour |
| 5,742,278 A | * | 4/1998 | Chen et al. .................. 345/161 |
| 5,766,016 A | | 6/1998 | Sinclair |
| 5,785,630 A | | 7/1998 | Bobick et al. |
| 5,854,622 A | * | 12/1998 | Brannon ..................... 345/161 |
| 5,898,599 A | * | 4/1999 | Massie et al. ............... 345/161 |
| 5,956,016 A | * | 9/1999 | Kuenzner et al. ........... 345/156 |
| 5,999,168 A | * | 12/1999 | Rosenberg et al. ......... 345/161 |
| 6,002,184 A | * | 12/1999 | Delson et al. ................. 310/14 |
| 6,104,158 A | * | 8/2000 | Jacobus et al. ........ 318/568.11 |
| 6,104,382 A | * | 8/2000 | Martin et al. ............... 345/161 |
| 6,111,577 A | | 8/2000 | Zilles et al. |
| 6,160,489 A | | 12/2000 | Perry et al. |
| 6,195,083 B1 | * | 2/2001 | Salcudean et al. .......... 345/161 |
| 6,219,034 B1 | | 4/2001 | Elbing et al. |
| 6,241,611 B1 | * | 6/2001 | Takenda et al. .............. 463/38 |
| 6,320,284 B1 | * | 11/2001 | Fontana et al. ............... 310/12 |
| 6,422,941 B1 | | 7/2002 | Thorner et al. |
| 6,593,907 B1 | * | 7/2003 | Demers et al. ............. 345/156 |
| 2003/0030619 A1 | * | 2/2003 | Martin et al. ............... 345/156 |

FOREIGN PATENT DOCUMENTS

| | | | |
|---|---|---|---|
| EP | 0 085 518 B1 | | 8/1989 |
| EP | 0349086 | | 1/1990 |
| GB | 2347199 A | | 8/2000 |
| JP | H2-185278 | | 7/1990 |
| JP | H4-8381 | | 1/1992 |
| JP | H5-192449 | | 8/1993 |
| JP | H7-24147 | | 1/1995 |
| WO | WO9833136 | | 7/1998 |
| WO | 00/03319 | * | 1/1999 |

OTHER PUBLICATIONS

Baigrie, "Electric Control Loading—A Low Cost, High Performance Alternative," Proceedings, pp. 247-254, Nov. 6-8, 1990.

Iwata, "Pen-based Haptic Virtual Environment," 0-7803-1363-Jan. 1993 IEEE, pp. 287-292.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Vertag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, Control System Design for a Three Degree of Freedom Virtual Environment Simulator Using Motor/Brake Pair Actuators, MIT Archive© Massachusetts Institute of Technology, pp. 1-88, Feb. 1990.

Caldwell et al., "Enhanced Tactile Feedback (Tele-Traction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances in Robotics, Edited by H. Kazerooni, pp. 1-12, 1992.

Gotow et al, "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSV-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Adelstein, "A Virtual Environment System For The Study of Human Arm Tremor," Ph.D Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 98, Feb. 1990.

Terry et al., "Tactile Feedback In A Computer Mouse," Proceedings of Fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System For Dual-Arm Teleoperation," SOAR '89 Workshop, JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8-11, 1994.

Bejczy, et al., "Universal Computer Control System (UCCS) For Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," Logitech Cyberman SWIFT Supplement, Apr. 5, 1994.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

Bliss, "Optical-to-Tactile Image Conversion for the Blind," IEEE Transactions on Man-Machine Systems, vol. MMS-11, No. 1, Mar. 1970.

Calder, "Design of A Force-Feedback Touch-Introducing Actuator For Teleoperator Robot Control," Bachelor of Science Thesis, MIT, Jun. 23, 1983.

Johnson, "Shape-Memory Alloy Tactile Feedback Actuator," Armstrong Aerospace Medical Research Laboratory, AAMRL-TR-90-039, Aug., 1990.

Kontarinis et al., "Tactile Display of Vibratory Information in Teleoperation and Virtual Environments," PRESENCE, vol. 4, No. 4, pp. 387-402, 1995.

Lake, "Cyberman from Logitech," GameBytes, 1994.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick, "Design, Construction, and Testing of a Fingertip Tactile Display for Interaction with Virtual and Remote Environments," Master of Science Thesis, MIT, Nov. 8, 1990.

Wiker, "Teletouch Display Development: Phase 1 Report," Technical Report 1230, Naval Ocean Systems Center, San Diego, Apr. 17, 1989.

"Taking a Joystick Ride", Computer Currents, Tim Scannell, Nov. 1994, Boston Edition, vol. 9 No. 11.

"Coaxial Control Shaker Part No. C-25502," Safe Flight Instrument Corporation, 26 pages, Jul. 1, 1967; Revised Jan. 28, 2002.

GB The Patent Office, Search Report Under Section 17, Jul. 31, 2003.

* cited by examiner

FORCE FEEDBACK DEVICE INCLUDING SINGLE-PHASE, FIXED-COIL ACTUATORS

CROSS REFERENCE TO RELATED APPLICATIONS

This application claims priority to U.S. Provisional Application No. 60/133,208, filed May 7, 1999 by Moore et al., which is incorporated herein by reference in its entirety.

BACKGROUND OF THE INVENTION

The present invention relates generally to the interfacing with computer devices by a user, and more particularly to devices used to interface with computer systems and which provide force feedback to the user.

Humans interface with electronic devices in a variety of applications, and the need for a more natural, easy-to-use, and informative interface device is a constant concern. One of those applications includes interacting directly with computer-generated environments. Interface devices are used extensively with computer systems in the implementation of computer-controlled games, simulations, and other applications very popular with the mass market of home consumers. In a typical implementation, a computer system such as a personal computer, home video game console, portable computer, etc., displays a visual environment to a user on a display device. Users can interact with the displayed environment by inputting commands or data from the interface device. Popular interface devices include joysticks, "joypad" or "gamepad" button controllers, mice, trackballs, styluses, tablets, pressure spheres, foot or hand pedals, or the like, that are connected to the computer system controlling the displayed environment. The computer updates the environment in response to the user's manipulation of a moved manipulandum such as a joystick handle, joypad, or mouse, and provides visual feedback to the user using the display screen.

In some interface devices, haptic (e.g., tactile and/or kinesthetic) feedback is also provided to the user, more generally known as "force feedback" herein. These types of interface devices can provide physical sensations to the user manipulating the physical object of the interface device. Typically, motors or other actuators of the interface device are coupled to the manipulandum and are connected to the controlling computer system. The computer system receives sensor signals from the interface device and sends appropriate force feedback control signals to the actuators in conjunction with host events. The actuators then provide forces on the manipulandum. A local microprocessor in the device can be used to offload some computational burden on the host. The computer system can thus convey physical sensations to the user in conjunction with other visual and auditory feedback as the user is contacting the manipulandum. Commercially available force feedback devices include the ForceFX joystick from CH Products, Inc., the Wingman Force joystick and Wingman Formula Force steering wheel from Logitech, Inc., and the Sidewinder Force Feedback Pro joystick from Microsoft Corporation.

One problem occurring in commercially-available implementations of force feedback devices is that the devices are very bulky. A large base or support is typically required to house large motors or other types of actuators. These features make it difficult to integrate compelling force feedback into a smaller interface device such as a handheld gamepad, joystick, remote control, or other device. Yet, these controllers are preferred input devices for many types of systems, especially home video game consoles, and are also preferred by many consumers. Besides simple vibrations and the like, realistic force feedback has not previously been integrated into such handheld devices.

SUMMARY OF THE INVENTION

The present invention provides a force feedback interface device which interfaces a user with a computer system. The force feedback device provides force feedback to a user object such as a joystick handle manipulated by a user, where at least one single phase, fixed coil actuator is used to provide the force feedback. These actuators can be made very small motor and thus can be used to provide realistic force feedback in small devices such as gamepads and handheld joysticks.

More particularly, in one aspect of the present invention, a force feedback interface device inputs control signals to a computer and outputs forces to a user of the interface device. The device includes a housing gripped by the user of the device and can include a joystick handle (or other object) manipulable in at least two rotary degrees of freedom by the user. At least one sensor detects a position of the joystick handle in the degrees of freedom and outputs at least one sensor signal indicative of the position which is received by the computer. Two direct drive actuators are coupled to the joystick handle, each of the actuators providing torque in one of the rotary degrees of freedom. Each of the actuators is a brushless, single phase actuator having a limited rotational range, at least one grounded excitation coil, and a moving magnetic material. The joystick is mechanically constrained to not move past either of two limits where the torque output by the actuator in an unenergized state changes direction. The joystick handle can be oriented such that a center position of the joystick handle in the degrees of freedom is substantially at a local minimum reluctance position of the actuator, where the joystick is mechanically constrained to not move substantially past either local maximum reluctance position adjacent to the local minimum reluctance position when manipulated by the user. For example, each actuator can be limited to an angular range of approximately 50 degrees.

The local minimum reluctance position can in some embodiments provide a centering spring force on the joystick handle in the degrees of freedom biased toward the center position. In one preferred embodiment, each of the actuators includes four poles and two excitation coils. The joystick handle can be in the form of a sphere, a stick-like rod and engagement surface, direction pad, or other form. A gimbal mechanism is preferably coupled between the actuators and the joystick handle, such as a five-bar closed loop linkage. The sensor can be an optical encoder, e.g. an encoder disk rigidly coupled to a rotor of one of the actuators and including at least one encoder pattern. In some embodiments, at least four detectors can provide sensor signals about 45 degrees out of phase with each other, increasing the sensing resolution over a standard quadrature sensor. In the preferred embodiments, the joystick device is in the form of a handheld gamepad and the computer is a home video console system or personal computer.

The present invention provides a compact yet fully-functional feedback interface device that provides realistic and compelling force sensations to a user of the device. The single phase actuators described herein allow the interface device to be very small, yet provide a significant amount of force. When using the present invention, the kinesthetic force functionality of much larger joysticks and steering wheels can be easily integrated into handheld interface devices.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1A:
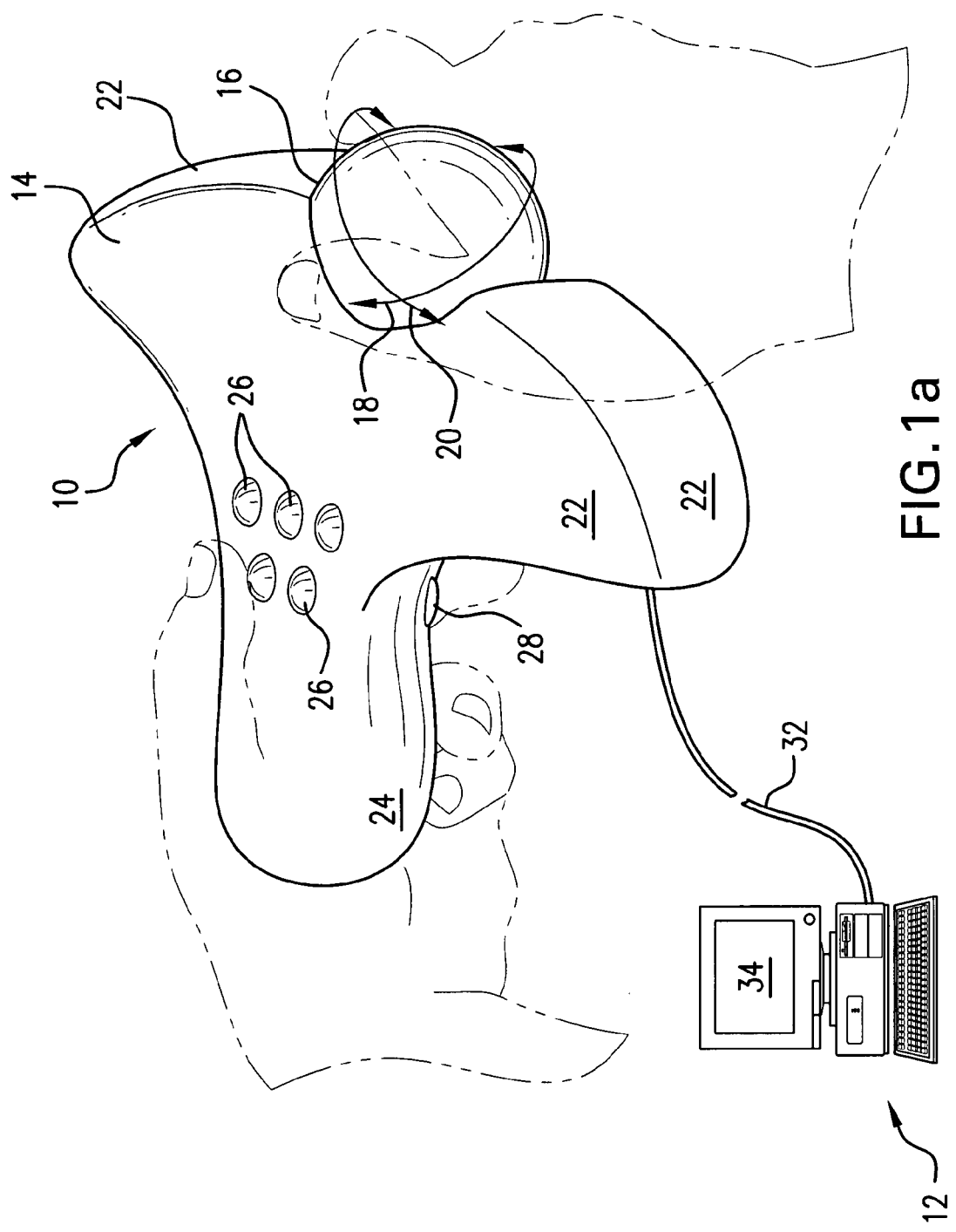
FIGS. 1a and 1b are perspective views of different embodiments of an interface device of the present invention.

FIG. 1a is a perspective view of a first embodiment of a force feedback interface device 10 of the present invention, used for interfacing a user with a computer generated environment implemented by a host computer 12.

Interface device 10 is in the form of a handheld controller, of similar shape and size to many "gamepads" currently available for video game console systems. A housing 14 of the interface device 10 is shaped to easily accommodate two hands gripping the device, either by a left-handed user or a right-handed user. In the described embodiment, a sphere 16 is included at one end of the device to be manipulated by the user. Sphere 16 may be rotated in place within two degrees of freedom, indicated by arrows 18 and 20. Thus, the sphere 16 operates much like a joystick in that it can be moved in two rotary degrees of freedom. The sphere 16 is included in the term "joystick" or "joystick handle" as referred to herein.

As shown, the user's hand is intended to grip the sphere between two or more fingers on approximately opposing points on the sphere, and rotate the sphere in the desired direction(s) using both fingers. This provides the user with a much more secure grip as compared to rolling the sphere with one finger or with two fingers contacting the sphere at approximately the same point. The more secure grip allows the user to experience more realistic resistive and assistive force sensations without losing control of the rotation of the sphere. Furthermore, the user may place at least a portion of the palm of the sphere-contacting hand against the rest portion 22 of the housing 14 to provide support to that hand (left handed users may place the hand on the opposing portion 22 on the other side of the sphere 16).

Interface device 10 also includes a button grip portion 24 of the housing 14 which the user may grasp with his or her other hand, as shown. The hand grasping portion 24 has easy access to one or more buttons 26, each of which may be pressed by the user to provide a distinct input signal to the host computer 12. Instead of or in addition to buttons 26, other controls may be placed within easy reach of the hand grasping portion 24. For example, a directional button pad or "joypad" can be provided to allow additional input from the user, which typically provides a single piece which may be moved in four or eight directions to provide input in each direction. Furthermore, an additional directional manipulandum such as a fingertip joystick can be positioned near buttons 26 for use by the hand on portion 24 (sphere 16 can also be implemented as a fingertip joystick, as described below). Such fingertip joysticks can be moved in two degrees of freedom, as is well known to those skilled in the art. One or more trigger buttons 28 can also be positioned on the underside of grip portion 24 and can be pressed by the fingers of the user. Other controls can also be provided, such as a dial or slider for throttle control in a game, a four- or eight-way hat switch, etc. Some embodiments can provide a directional pad that is coupled to a gimbal mechanism as described below with reference to FIGS. 2 and 3 and which moves rotationally in two degrees of freedom similar to sphere 16 or a fingertip joystick; such a directional pad can also be considered a force feedback "joystick" as referenced herein.

Furthermore, the buttons 26 and/or 28 or other controls such as a directional joypad pad can be provided with force feedback, such as tactile feedback and/or kinesthetic feedback, as described in copending patent application Ser. No. 09/156,802, filed Sep. 17, 1998, and incorporated herein by reference. The forces can be colocated such that the user feels the forces in the degree of freedom of movement of the button or joypad; or, the button or joypad can be provided with tactile sensations such as vibrations. For example, a directional pad can be provided with force feedback on one or more of the directions of the pad, or on a motion of the entire pad as it is pressed downward (e.g. from the center of the pad). Using one or more actuators and sensors coupled to the buttons or other controls, a variety of force sensations can be output to the user who is contacting the button. For example, jolts, vibrations, textures, spring forces, damping forces, and obstruction forces can be output. Forces can be at least in part based on the position of the button in its degree of freedom, and/or independent of button position. Furthermore, a moveable portion can be provided on the housing 14 which is contacted by the user when the user operates the device and which is described in copending patent application Ser. No. 09/156,802. The linear voice coil actuators described in application Ser. No. 09/156,802 may also be used to actuate controls in the present invention.

In yet other embodiments, a similar force feedback interface device can be implemented in other applications, such as a hand-held remote control device used to access the functions of a device or appliance remotely by a user (such as a television, video cassette recorder, sound stereo, Internet or network computer connected to a television, etc.). The force feedback device 10 can also be connected to a vehicular control system and used for interface functions in a vehicle such as an automobile, e.g., temperature control, map navigation control, selection from lists, etc. Some of such vehicular embodiments can use a joystick as described above, while others may use a knob coupled to one of the actuators described herein for rotational force feedback.

Interface device 10 is coupled to host computer 12 by a bus 32, which can be any of several types of communication media. For example, a serial interface bus, parallel interface bus, or wireless communication link can be used. Specific implementations can include Universal Serial Bus (USB), IEEE 1394 (Firewire), RS-232, or other standards.

Host computer 12 is preferably a personal computer, workstation, video game console, or other computing or electronic device. Personal computers, such as an IBM-compatible or Macintosh personal computer, or a workstation, such as a SUN or Silicon Graphics workstation, can be used. Alternatively, one of a variety of home video game systems, such as systems available from Nintendo, Sega, or Sony, a television "set top box" or a "network computer", etc. can be used. Host computer system 12 preferably implements a host application program with which a user is interacting via peripherals and interface device 10. For example, the host application program can be a video or computer game, medical simulation, scientific analysis program, operating system, graphical user interface, or other application program that utilizes force feedback.

The host application preferably displays graphical images of the environment on a display device included with the host computer, such as display screen 34, a television, 3D goggles, LCD display, etc. The software and environment running on the host computer 12 may be of a wide variety. For example, the host application program can be a video game, simulation, graphical user interface (GUI), Web page or browser that implements HTML or VRML instructions, scientific analysis program, virtual reality training program or application, or other application program that utilizes input from the interface device 10 and outputs force feedback commands to the controller. For example, many game application programs include force feedback functionality and may communicate with the force feedback interface device 10 using a standard protocol/drivers such as I-Force®, available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated cockpit of an aircraft might be considered a graphical object.

In operation, the controls of interface device 10 are manipulated by the user, which indicates to the computer how to update the implemented application program(s). An electronic interface included in housing 14 of device 10 can couple the device 10 to the computer 12. The host computer 12 receives the input from the interface device and updates an application program in response to the input. For example, a game presents a graphical environment in which the user controls one or more graphical objects or entities using the sphere 16 and other controls such as buttons 26 and 28. The host computer, in turn, provides force feedback commands and data to the device 10 to cause force feedback to be output on sphere 16 and/or other controls.

Figure 1B:
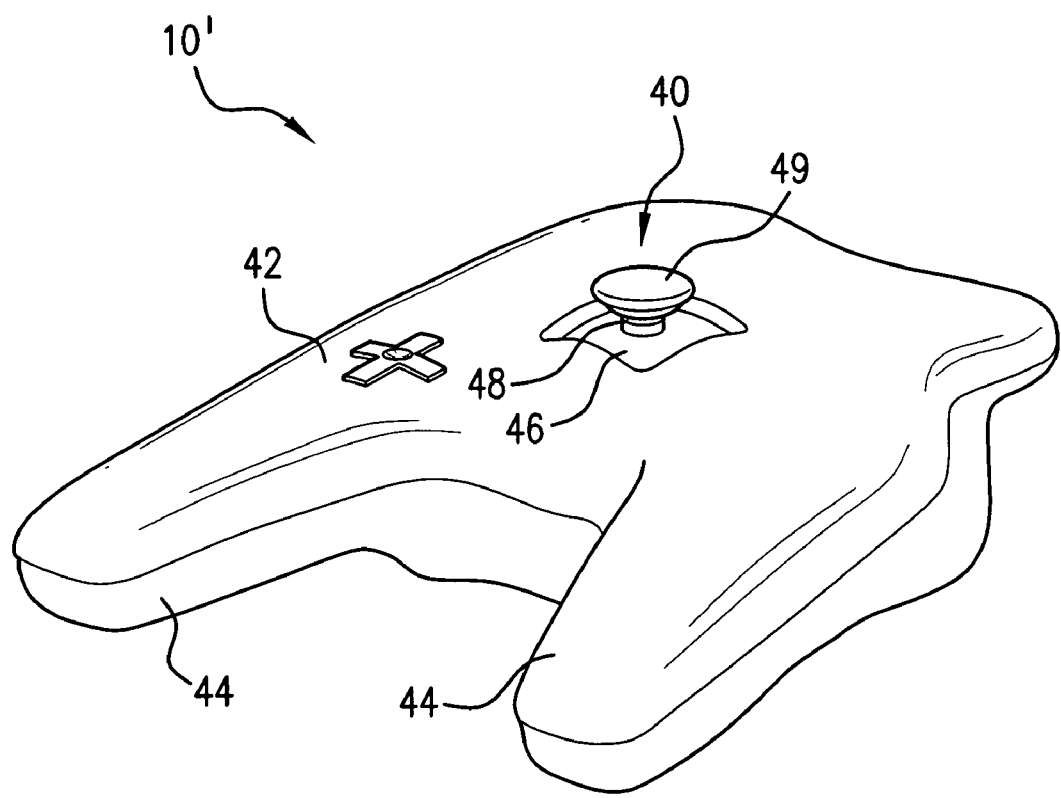

FIG. 1b is a perspective view of a preferred embodiment of a force feedback device 10' of the present invention. Like the interface device of FIG. 1a, device 10' is coupled to a host computer 12 to interface with one or more application programs running on the host computer. In embodiment 10,' sphere 16 is implemented as a finger joystick 40 that is positioned near a middle area of the housing 42 of the device 10'. The user can grasp each of grips 44 of the device and use either thumb to manipulate the joystick 40 in two or more degrees of freedom, for example. Finger joystick 40 preferably includes a sphere 46 which can be implemented similarly to the sphere 16 of the device 10. A rod 48 extends out of the sphere 46 and has a finger engagement surface 49 which the user contacts to manipulate the joystick. Surface 49 can be textured or provided with a frictional material to allow the user's finger to achieve a firm grip on the joystick. In other embodiments, differently-shaped surfaces can be used in place of surface 49, such as receptacles, cradles, etc. In other embodiments, the sphere 46 can be contacted directly by the user, similarly to the sphere 16 of FIG. 1a. For example, portions of the sphere 46 can extend out of both the top and bottom portions of the housing 42, allowing at least two fingers of the user to grip the sphere. Buttons, joypads, dials, sliders, and other controls can be provided at various locations on the housing of the device 10', such as on or underneath the grip portions 44, on the front of the device, etc.

Figure 2:
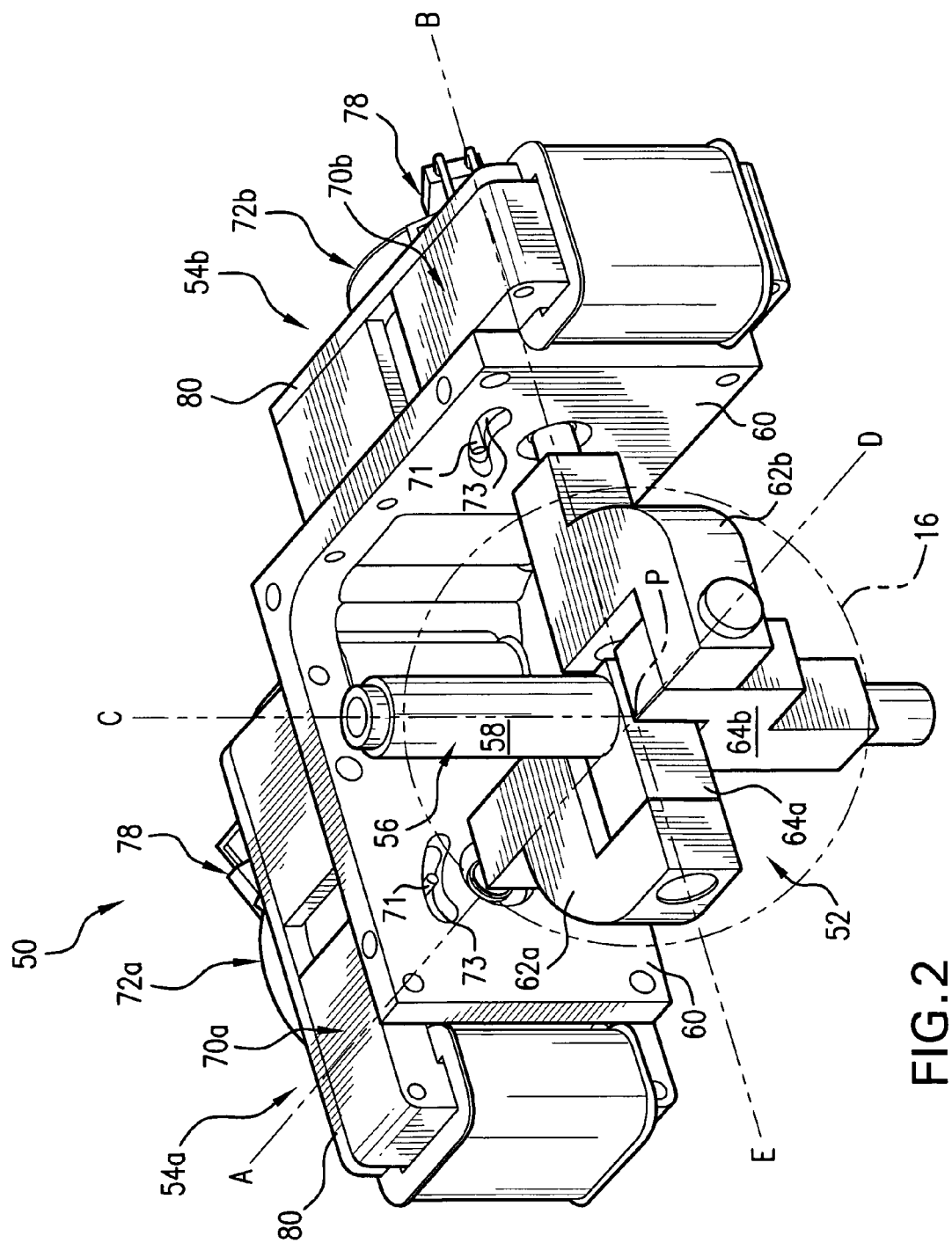
FIGS. 2 and 3 are perspective views of a mechanical system for use with the interface device of FIG. 1a or 1b.
Figure 3:
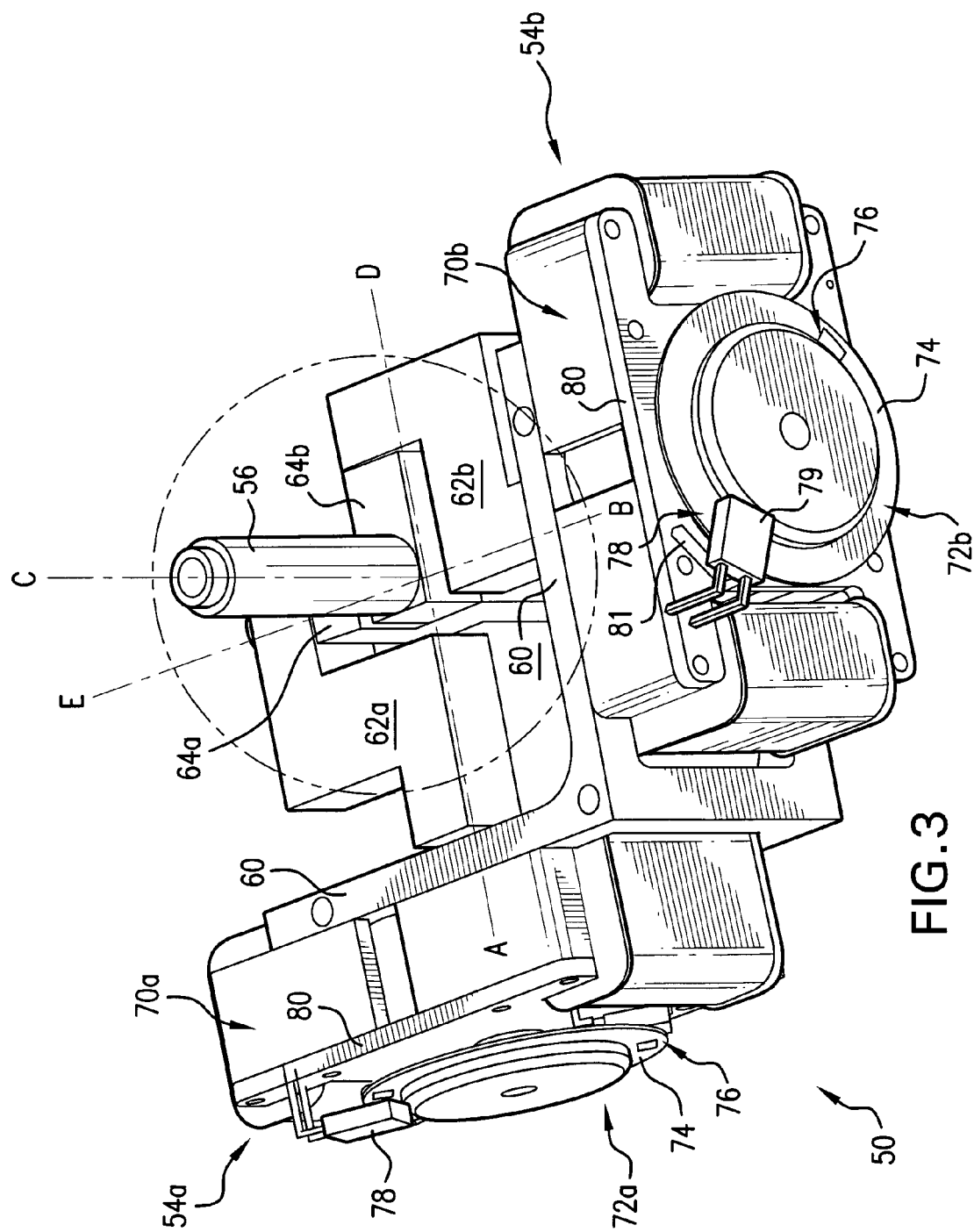

FIGS. 2 and 3 are perspective views of a mechanical system 50 for use with the interface device 10 of the present invention. FIG. 2 illustrates a front view of the mechanical system, while FIG. 3 illustrates a rear view of the mechanical system. Mechanical system 50 includes a gimbal mechanism 52 and transducers 54a and 54b. A manipulandum 56, such as sphere 16 or a joystick handle, is coupled to the gimbal mechanism 52. For example, the sphere 16 is shown as a dashed line. A joystick handle 58 is also shown, which can be used in other embodiments.

Gimbal mechanism 52 can be of a variety of types of linkages. In FIGS. 2 and 3, a five-bar closed-loop linkage is shown that provides two degrees of freedom to manipulandum 56, where the members of the gimbal mechanism are rotatably coupled to one another through the use of bearings or pivots. A ground member 60, shown schematically, is provided as support, where two extension members 62a and 62b are rotatably coupled to the ground member. A central member 64a is rotatably coupled to extension member 62a and a central member 64b is rotatably coupled to extension member 62b. Central members 64a and 64b are rotatably coupled to each other at an intersection point P, where the manipulandum 56 is preferably coupled to one of the central members 64. The gimbal mechanism operates such that extension member 62a can rotate about an axis A, central member 64b can rotate about a floating axis D, extension member 62b can rotate about axis B, and central member 64a can rotate about floating axis E. The axes D and E are "floating" in the sense that they are not fixed in one position as are axes A and B. Axes A and B are substantially mutually perpendicular. The five-bar linkage is arranged such that extension member 62a, central member 64a, and central member 64b can be rotated about axis A in a first degree of freedom. Furthermore, extension member 62b, central member 64b, and central member 64a can be rotated about axis B in a second degree of freedom. A similar structure is also disclosed in parent U.S. Pat. No. 5,731,804, which is incorporated by reference herein. In alternate embodiments, additional degrees of freedom can be provided. For example, manipulandum 56 can be rotated about axis C extending perpendicularly from the plane formed by floating axes D and E. Or, manipulandum 56 can be linearly translated along floating axis C. These degree of freedom can be sensed and actuated, if desired. Suitable embodiments of mechanism 52 are described in greater detail in U.S. Pat. No. 5,731,804, and co pending application Ser. No. 09/058,259, filed Apr. 10, 1998 and Ser. No. 09/138,304, filed Aug. 21, 1998 by Bruneau et al., which are incorporated herein by reference. Other linkage mechanisms can also be used in other embodiments. For example, a slotted bail mechanism suitable for use in mechanical system 50 is described in U.S. Pat. No. 5,767,839, incorporated herein by reference.

Two transducers 54a and 54b as shown in FIGS. 3 and 4 are included to sense motion in the two degrees of freedom of manipulandum 56 and to output forces on the manipulandum in those degrees of freedom. Transducer 54a includes an actuator 70a and a sensor 72a, and transducer 54b includes an actuator 70b and a sensor 72b. Each actuator 70 has a housing that is coupled to ground member 60 (or is otherwise grounded) and has a rotating shaft which is coupled to an extension member 62. Actuator 70a outputs a force (torque) on the extension member 62a about axis A, and actuator 70b outputs a force (torque) on the extension member 62b about axis B, thereby transmitting these forces to the manipulandum 56 via central members 64.

Actuators 70 are preferably "direct drive" actuators, i.e. the actuator is connected directly to the gimbal mechanism 56 and there is no transmission positioned between the actuator and the gimbal mechanism or manipulandum 56. Although such transmissions, such as belt drives, cable drives, and gears, allow forces output on the manipulandum 56 to be amplified, in the present invention such amplification is typically unnecessary since actuator 70 is capable of producing a torque of sufficient magnitude for intended applications. For example, such applications include force feedback on sphere 16, a small joystick, or a dial, which typically require less force magnitude than other devices such as full-sized joysticks and steering wheels. Of course, in other embodiments such an amplification transmission can be included in device 10.

Actuators 70 are preferably limited to a desired angular range, which is described in greater detail with respect to FIG. 9, below. To limit the rotational range, physical stops can be included in the actuator. For example, a pin 71 can be coupled to the rotor of the actuator and extends into and moves within an aperture 73 in the grounded member 60 as the rotor moves. When the pin 71 impacts the side of an aperture 73, the rotor is prevented from moving further in that direction. Physical limits can be implemented in other ways in other embodiments; for example, a pin can be directly coupled to the shaft of the actuator to engage stop members providing a desired angular range.

Sensor 72a is preferably coupled to the rotating shaft (rotor) of the actuator 70a, and sensor 72b is likewise coupled to the rotating shaft of the actuator 70b. Sensor 72a senses rotational motion and/or position of extension member 62a about axis A, which is in turn indicative of the motion or position of manipulandum 56 in that degree of freedom. Similarly, actuator sensor 7b senses the motion or position of manipulandum about axis B.

In the described embodiment, sensors 72 are digital optical encoders which each include a rotating disc 74 (or arc) that rotates with the rotating shaft of the actuator and a pattern 76 provided on the disc 74. Pattern 76 need only be provided over a small fraction of the total circumference of the disc 74 or other encoder member, because the actuators 70 preferably have a limited angular range of motion, as described in greater detail below. Pattern 76 includes a number of equally-spaced slots (apertures) which are used to provide encoded sensor signals for the sensor 72 (opaque marks or lines can alternatively be used). For example, in one embodiment, pattern 76 can include 250 thin slots having a thickness of 0.025 mm and having a pitch of 0.05 mm on the disc; other spacings and amounts of slots can also be used. An emitter detector pair 78 is positioned to sense the motion of the pattern. An emitter 79 is positioned on one side of the disc 74 and emits a beam of energy (such as infrared light) through the slots of the pattern 76. When the pattern 76 moves beneath the emitter detector pair 78, the beam is either transmitted to a detector portion 81 positioned on the other side of the disc 74, or the beam is blocked from passing through the disc by the opaque disc material. The sensor 72 provides one or more encoder signals which indicates how many marks have been moved past the detector. Preferably, a quadrature sensor is used which includes two individual detectors in the detector assembly 81 which are spaced 90 degrees out of phase to allow the direction of rotation of the disc 74 to be detected, as described with reference to FIGS. 7 and 8. Such encoders are well known to those skilled in the art. Furthermore, in some embodiments an "octature" sensor can be used, which provides two additional detectors spaced to provide signals 45 degrees out of phase with the other detector signals. This provides double the sensing resolution of quadrature sensors. Such octature sensors are described in greater detail in copending patent application Ser. No. 09/071,136, filed Apr. 30, 1998 and incorporated herein by reference. If such octature sensing is used, a second pattern 76 can be provided and a second emitter detector pair 78, which can be positioned at a different location around the disc 74.

Sensors 72 can be provided as different types and forms of sensors in other embodiments. For example, the emitters and detectors and encoder pattern can be positioned at other locations with respect to the actuator 70. Furthermore, other types of sensors may be used, such as analog potentiometers, optical sensors, photodiode sensors, photoresistor sensors, capacitive sensors, Hall effect sensors, etc.

In a preferred embodiment, each transducer 54 also includes a substrate 80 which is coupled to the housing of the actuator. For example, substrate 80 can be a printed circuit board. This allows some or all of the control electronics for the sensor 72 to be integrated on the substrate 80, thereby saving cost and space in the interface device 10. Thus, the leads of the emitter-detector 78 can be coupled directly to a circuit on the substrate 80.

Figure 4A:
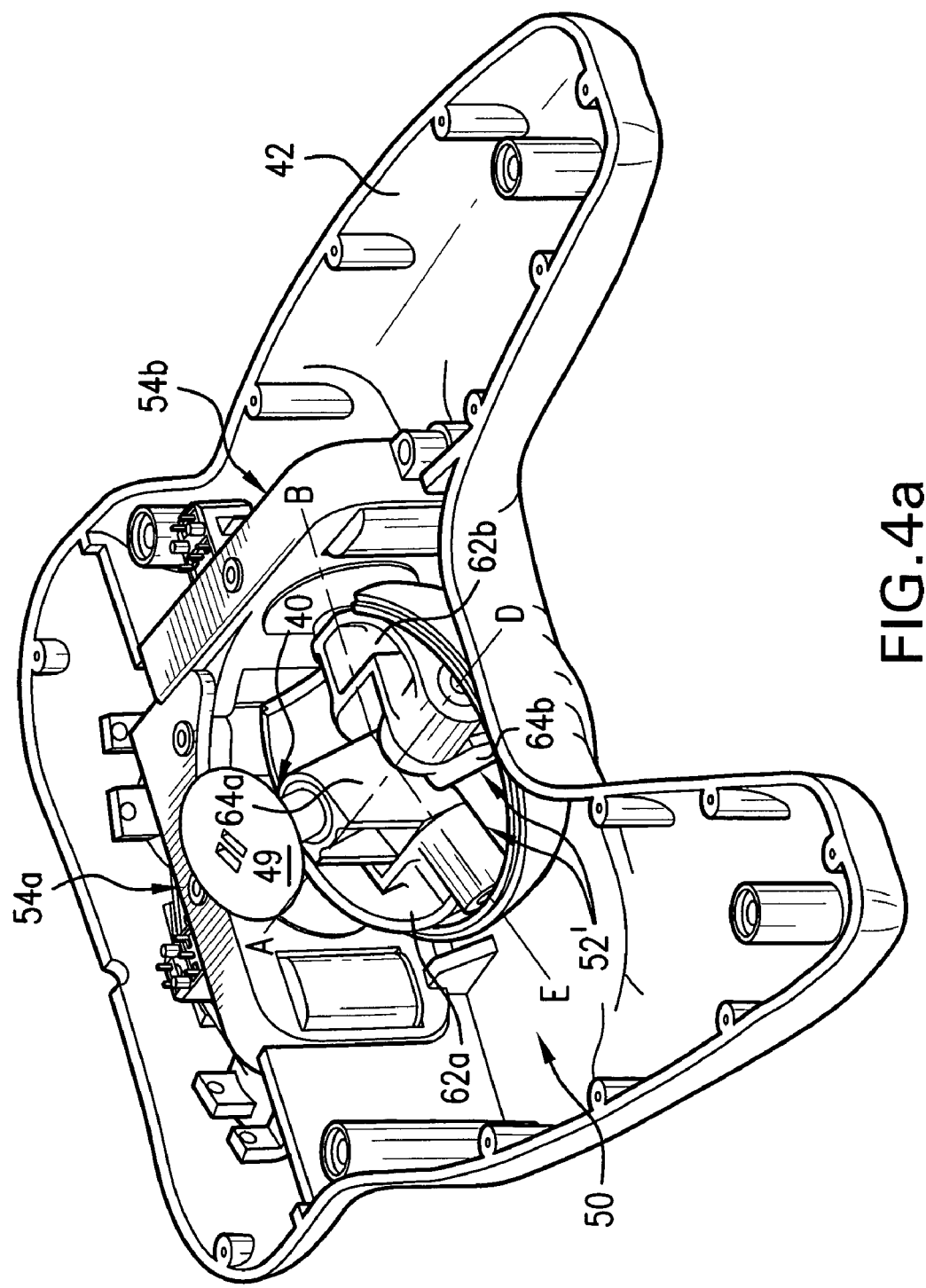
FIGS. 4a and 4b are perspective views of a mechanical system for use with the interface device of FIG. 1b.
Figure 4B:
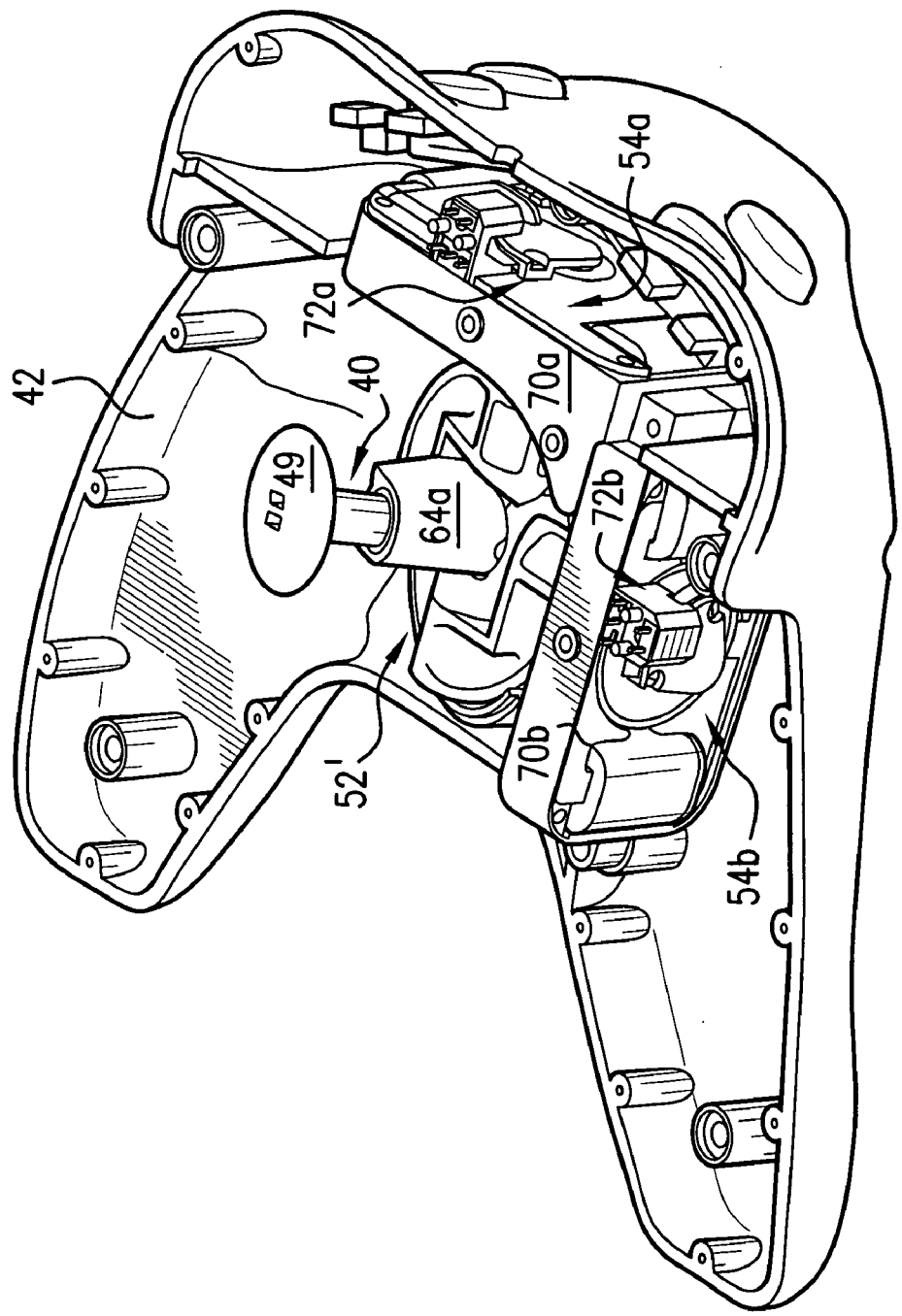

FIGS. 4a and 4b are perspective views of front and rear of alternate mechanical system 50 when used in the interface device 10' of FIG. 1b. A lower half of housing 42 holds the mechanical system 50 including the gimbal mechanism 52' and the transducers 54. A lower half of the sphere 46 is shown surrounding the gimbal mechanism 52,' where the upper half of the sphere 46 covers the remaining exposed portion of the gimbal mechanism. Finger joystick 40 is coupled to one of the central members 64a or 64b of the gimbal mechanism. Gimbal mechanism 52' operates similarly to gimbal mechanism 52.

Figure 5A:
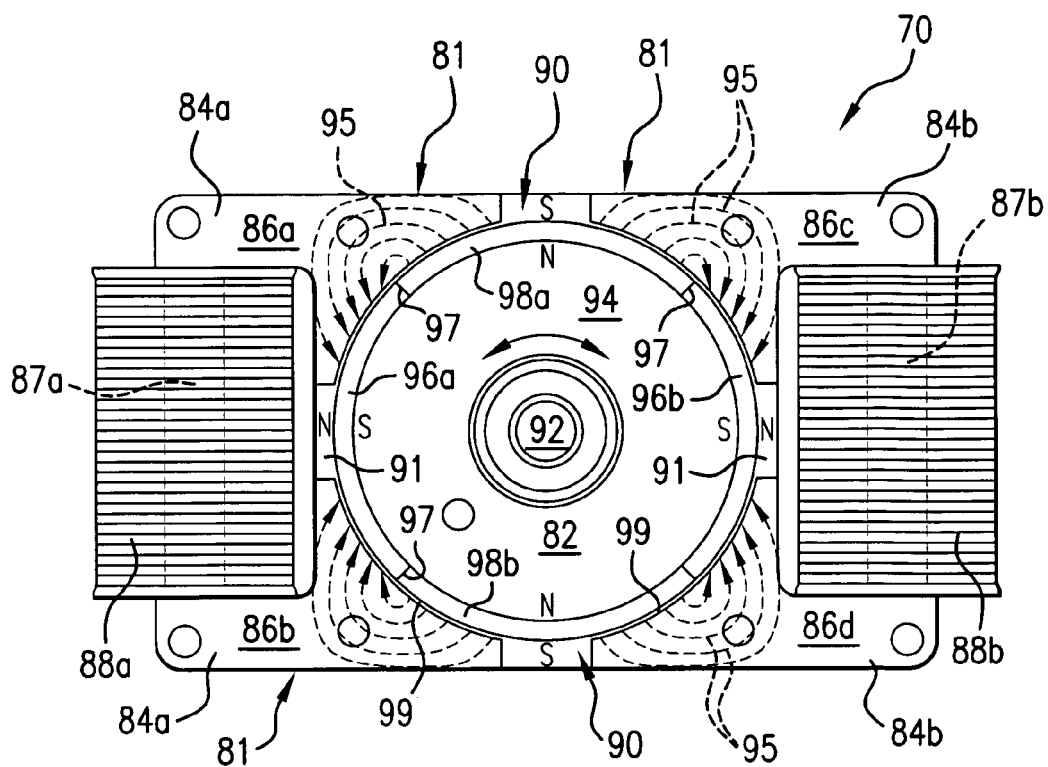
FIGS. 5a–5c are front elevational views of a preferred transducer for use in the mechanical system of FIGS. 2–4 and showing a rotor at different rotational positions.
Figure 5B:
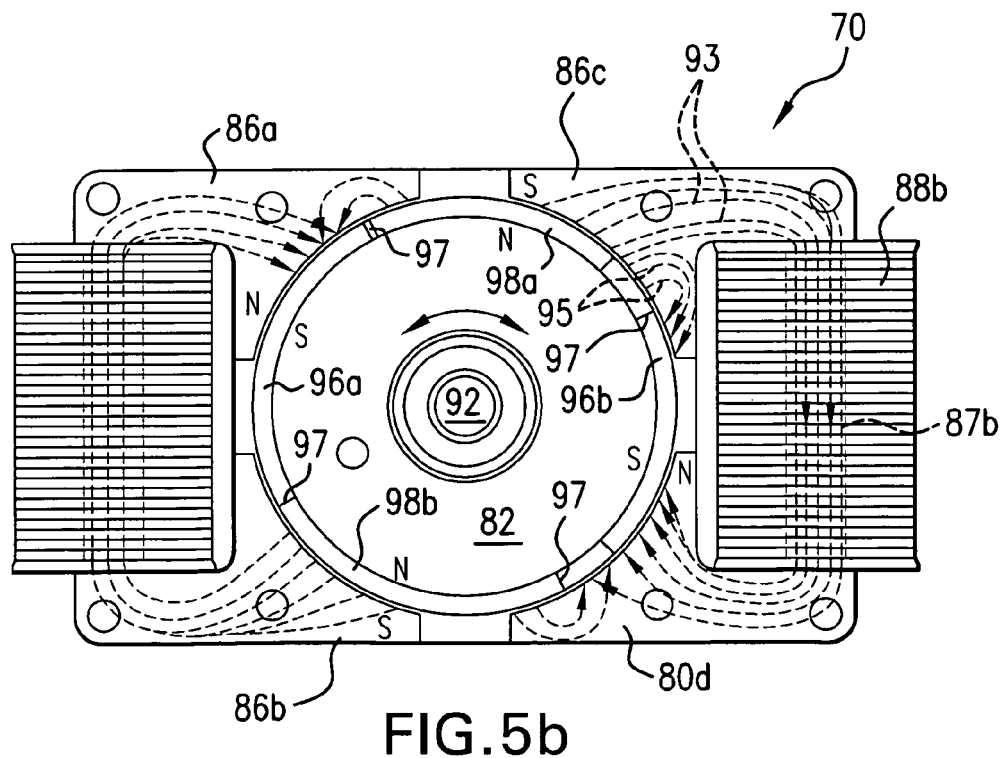
Figure 5C:
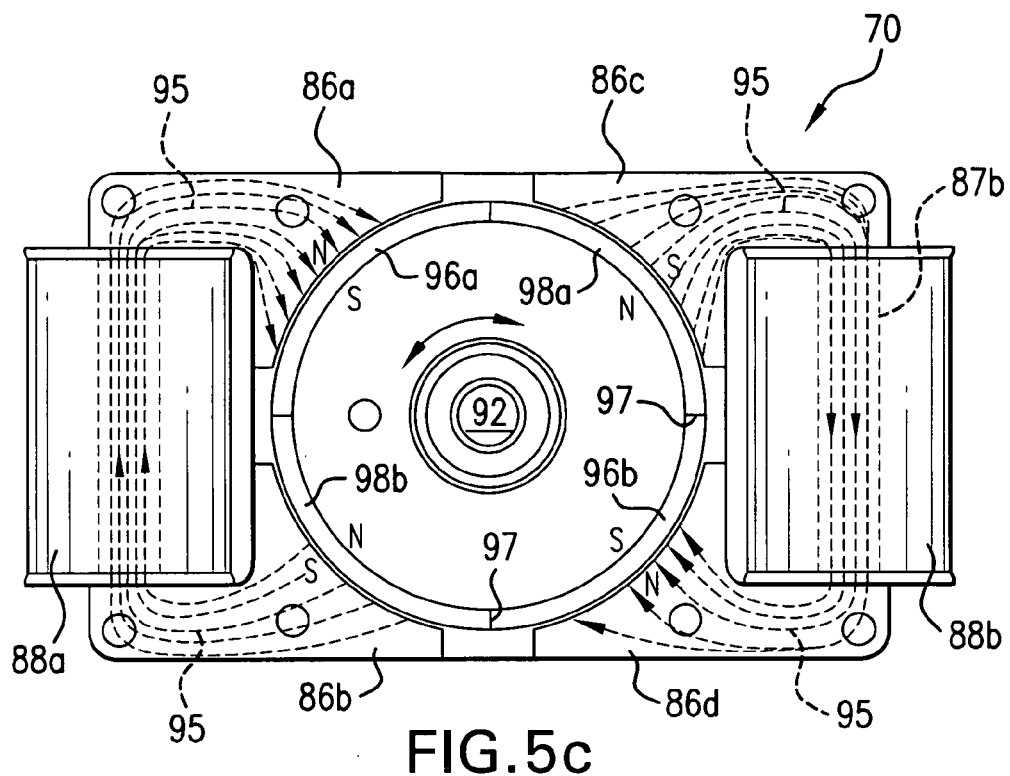

FIGS. 5a, 5b, and 5c are side elevational views of a preferred embodiment of an actuator 70 included in the mechanical system 50 of FIGS. 2 and 3. As shown in FIG. 5a, actuator 70 includes a stator assembly 81 and a rotor 82. Stator assembly 81 includes two stators 84a and 84b. Stator 84a includes a stator portion 86a, a stator portion 86b, and an excitation coil 88a. Stator 84a includes linking portion 87a that extends through the coil 88a and links the portions 86a and 86b, i.e. the coil 88a is wrapped around a length of the linking portion 87a. Stator 84b similarly includes a stator portion 86c, stator portion 86d, and an excitation coil 88b wrapped around a linking portion 87b. An air gap 90 is provided between the two stators 84a and 84b. The two stators 84a and 84b can be coupled together by a circuit board 80 as described above. In addition, an air gap 91 is preferably positioned between the stator portions 86a and 86b and between the stator portions 86c and 86d as shown.

Rotor 82 is positioned between the two stators 84a and 84b of the stator assembly 81. Rotor 82 includes a shaft 92, a core 94, magnets 96a and 96b, and magnets 98a and 98b. Shaft 92 is coupled to the core 94. Magnets 96a and 96b can be sections of a cylinder glued or otherwise coupled to the core 94 in the positions shown. The north (N) and south (S) poles are preferably oriented as shown. Magnets 98a and 98b are cylindrical sections similar to the magnets 86, but are magnetized with poles opposite to those of magnets 86. The magnets 98 are positioned between the magnets 96 to provide alternating poles around the circumference of the rotor 82. In one preferred embodiment, the magnets 96 and 98 are all part of one contiguous magnet that has been magnetized into the portions 96a, 96b, 98a, and 98b, the process of which is well known to those skilled in the art. Alternatively, magnets 96 and 98 can be separate magnets joined or coupled together. The thickness (height) of the magnets 96 and the spacer portions 98 can be about 5–10 mm, but may be varied in particular embodiments depending on design considerations such as cost, desired output torque, weight, etc. The core 94 and stators 84 can be made of iron or other ferrous material, for example. Preferably, an air gap 99 between the magnets 96 and 98 and the stators 84a and 84b is ¼ mm or less. An actuator suitable for use as actuators 70 is described in U.S. Pat. No. 5,334,893 of Oudet et al., which is incorporated herein by reference.

The actuator 70 is a brushless motor that provides four N-S poles as shown (four rotor poles and four stator poles). Actuator 70 is single phase, meaning that a single energization coil 88 is used to provide torque on the rotor 82. Although two physical coils 88a and 88b are shown, these two coils are provided with the same magnitude and direction of current and thus act as a single coil. Furthermore, coils 88 are fixed with respect to ground and with respect to moving magnets 96 and 98.

The magnetic structure of the actuator 70 may provide an inherent torque on the rotor 82 when the coils 88 are not energized with current, depending on the position of the rotor 82 and on the geometry of the stators and magnets. The position of rotor 82 shown in FIG. 5a is a preferred center position in the range of motion of the rotor. In this position, the approximate magnetic flux lines 95 from one magnet 98 to another magnet 96 flow through the nearest stator 84. These flux lines are dictated by the poles on the outer edge of the magnets adjacent to the nearest stator. In FIG. 5a, the rotor 82 is positioned so that the division 97 between magnets 96 and 98 divides the adjacent stator portion 86 in half, such that there is approximately an equal amount of iron adjacent to each pole. There is sufficient metal in the stator 86 such that substantially all the flux 95 remains within a single stator portion 86. This is a stable position for the rotor 82 since the magnetic reluctance is low for the flux path; the position is known as a "local minimum reluctance position," indicating that there are other minimum reluctance positions in the range of the rotor.

Actuators 70 operate by flowing a current through both coils 88 to cause a magnetic field that interacts with the magnetic fields provided by magnets 96 and 98 of the rotor 82. When a coil 88 is energized with a current, additional flux is provided through linked portion 87 of each stator 84, which interacts with the existing flux 95 and causes the rotor 82 to move, i.e. poles on the stator are changed such that the pole interaction between rotor and stator induces movement of the rotor. Depending on the direction of the current in the coils, the rotor 82 can be made to rotate in either direction, clockwise or counterclockwise. This causes the shaft 92 to rotate and outputs a torque on the extension members of the gimbal mechanism 52.

FIG. 5b shows actuator 70 when the rotor 82 has been rotated clockwise a few degrees from the center position shown in FIG. 5a. In this position, when the actuator is in an unenergized state, some of the flux lines 95 in stator portion 86c are concentrated around the division 97 similarly as in FIG. 5a. However, some of the flux lines 93 in portion 86c are not able to reach an opposite pole adjacent to the same stator portion 86, and so instead move through the linked portion 87b as shown. Furthermore, there is less flux around the division 97 in stator portion 86d since there is less iron adjacent to the magnets. The flux in stator portion 86b is similar to that in stator portion 86c, and the flux in stator portion 86a is similar to that in stator portion 86d. These characteristics cause a resistive force opposing further motion of the rotor in the clockwise direction, i.e. the rotor wishes to rotate back to the minimum reluctance position of FIG. 5a.

FIG. 5c shows actuator 70 when the rotor 82 has been rotated further clockwise from the position shown in FIG. 5b. In this rotor position, the magnetic flux 95 travels through a stator portion 86b or 86c, through linked portion 87a or 87b, and into the adjacent stator portion 86a or 86d, respectively. Since a wide path is provided through linked portions 87, and since only one magnet pole is adjacent to each stator portion 86, this is another minimum reluctance position at which the rotor prefers to stay; thus, no torque biases the rotor in either direction while it is positioned as shown. When moving the rotor from the position of FIG. 5b to that of FIG. 5c, a resistive force is output until a maximum reluctance position is passed, after which an assistive force biases the rotor to the next minimum reluctance position shown in FIG. 5c.

The position of FIG. 5c is actually more stable than the position shown in FIG. 5a, i.e. it is the most preferential position of the rotor (and every 90 degrees of rotation from this position is another most-preferential position). However, this position is not the desired center position in the degree of freedom provided by the actuator. This is because a torque cannot be output on the rotor by energizing the coils 88 while the rotor is at this position. Any flux generated by energizing the coils at this position simply reinforces the present position of the rotor.

Figure 5D:
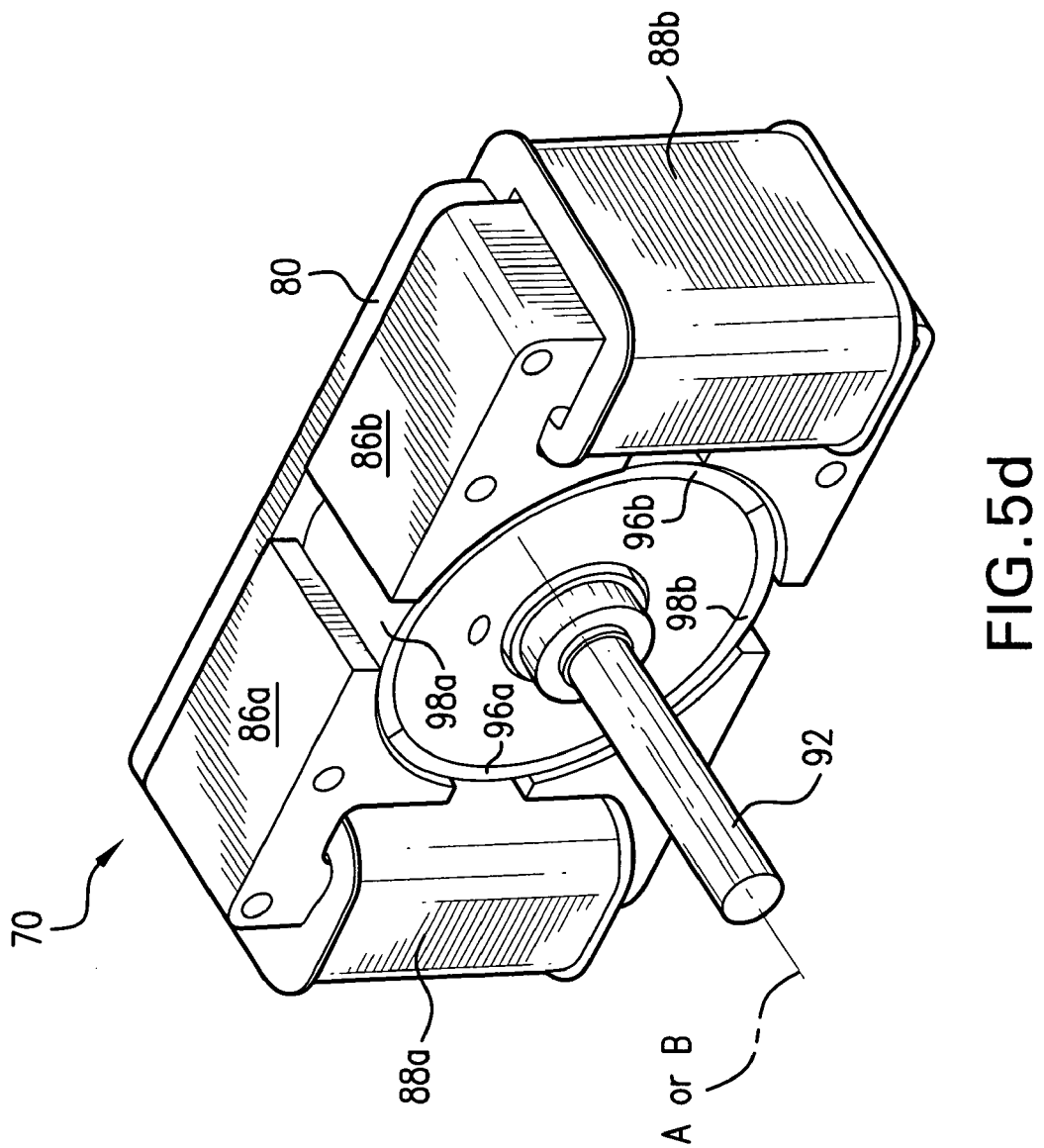
FIG. 5d is a perspective view of the transducer of FIG. 5.

FIG. 5d is a perspective view of the actuator 70 showing shaft 92 extending from the rotor. Shaft 92 is couple to the gimbal mechanism 52 as explained above.

Figure 6:
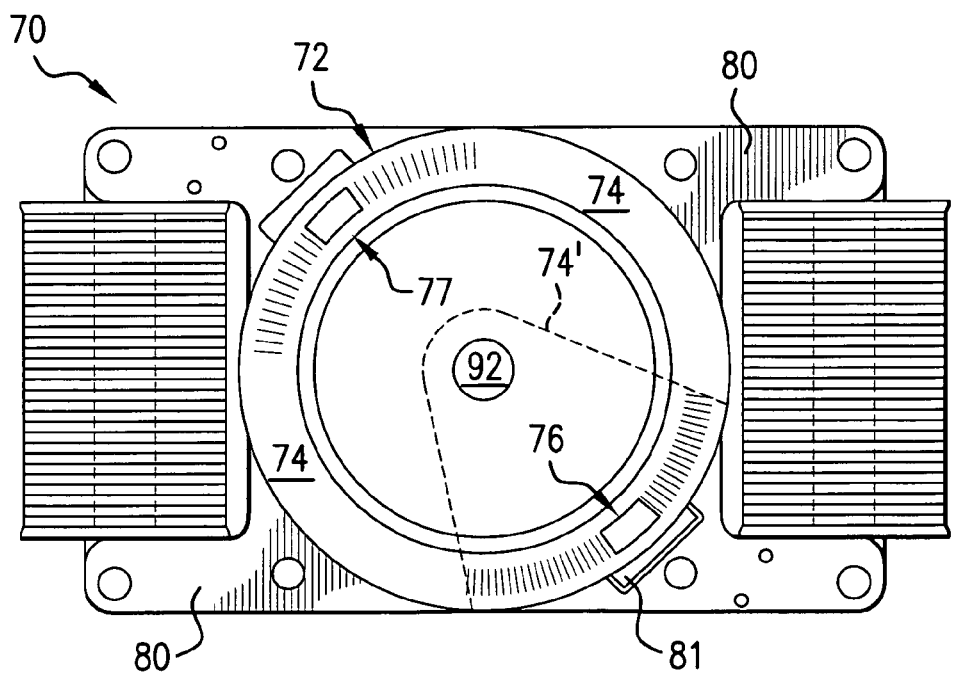
FIG. 6 is a rear elevational view of the transducer of FIG. 5.

FIG. 6 is a side elevational view of the opposite side of actuator 70 to the side shown in FIGS. 5a, 5b, and 5c. A portion of sensor 72 is shown, namely the encoder disc 74 and pattern 76 printed on the disc 74. Only detector 81 of the emitter-detector 78 is shown. Pattern 76 preferably extends over the entire rotational range of the rotor. In some embodiments, an entire disc 74 need not be provided; instead, an arc or sector 74' need only be provided which includes the pattern 76, thus saving cost of materials in comparison to the entire disc 74. A second pattern 77 on disc 74 and second emitter-detector (not shown) can be provided to provide the octature encoding described above. The pattern 77 can be positioned anywhere on the disc 74. Alternatively, additional detectors can be positioned at each pattern to provide a greater number of phase-shifted signals and therefore greater sensing resolution. Furthermore, in other embodiments, additional patterns can be positioned at different locations on the disc 74.

Figure 7:
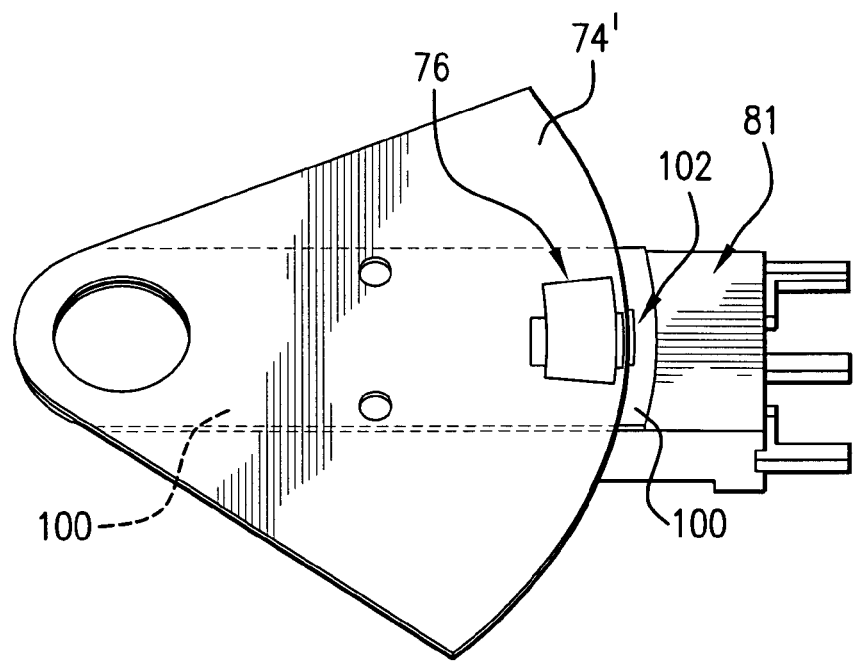
FIG. 7 is a perspective view of the sensing arc and reticle of the sensor of FIG. 6.

FIG. 7 is a perspective view of encoder arc 74' as shown in FIG. 6 and a detector 81. A portion of the pattern 76 is also shown (pattern 76 preferably extends across the entire face of the arc 74'). In one preferred embodiment, a slotted reticle 100 is positioned between the arc 74' and one of the two detectors of the detector assembly 81. Reticle 100 includes a number of slots in a reticle pattern 102 which allow the beam from the emitter to pass through, similar to the pattern 76. Reticle 100 is preferably provided on the surface of the housing enclosing detector assembly 81, and may be an elongated piece as shown which is coupled to a bearing around the rotational axis of the arc 74. The reticle can be a separate piece (or pieces) of material located some distance from the detector(s), or it can be a layer of opaque material (e.g. aluminum) which is deposited directly upon the surface of the detector assembly housing during the detector fabrication process. The reticle geometry can be produced as a separate manufacturing step (e.g. a mask layer), or as part of an existing chip masking step.

Figure 8:
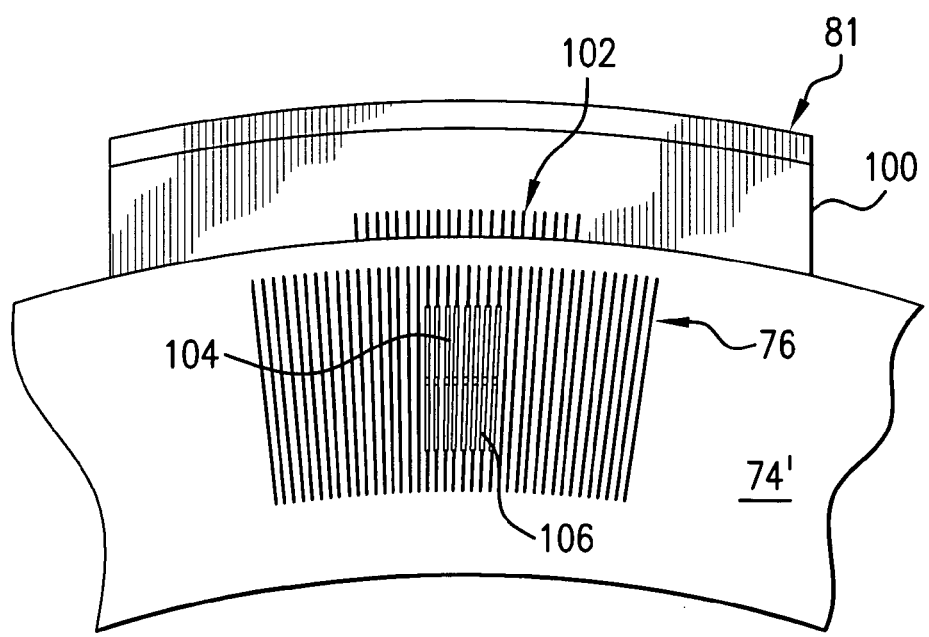
FIG. 8 is a top elevational view of the sensing arc and reticle of FIG. 7.

FIG. 8 shows the arc 74' positioned above the reticle 100 and two individual detectors 104 and 106, where the reticle includes slots over detector 106 that are 90 degrees out of phase with slots in reticle 100 over detector 104. Thus, the detector 104 will detect a magnitude of beam intensity 90 degrees out of phase with detector 106 as the arc is moved. In FIG. 8, the slots of the reticle are shown directly aligned with the slots in arc 74 over detector 76, while the slots of the reticle partially block light passing to detector 104. The resulting output sine waves (indicating intensity detected) from the detectors 104 and 106 can be filtered to provide a digital signal, for example, such that 50% or greater intensity is an on signal, and less than 50% intensity is an off signal. Thus, as the arc 74' moves across the detectors 104 and 106, quadrature sensor signals are obtained. The advantage to using reticle 100 is that a high sensing resolution can be obtained since the slots can be made very narrow with respect to the size of each detector 104 and 106. The sensor can alternatively also be provided with reflective strips instead of slots, where the emitter and detectors are provided on the same side of arc 74' and where reticle 100 is placed between the emitter/detectors and the arc 74.'

Figure 9:
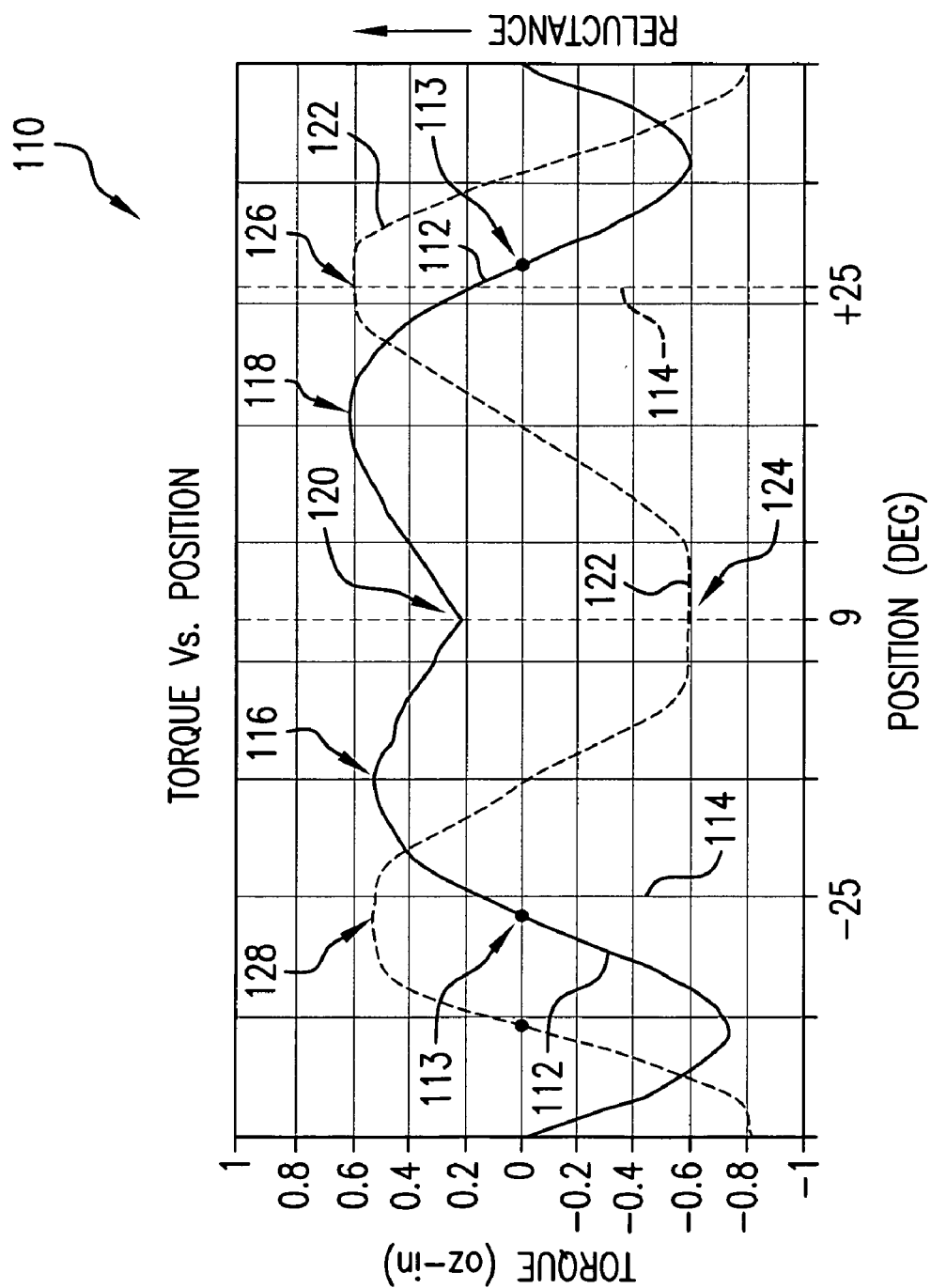
FIG. 9 is a torque vs. position profile and a reluctance vs. position indication for the actuator included in the transducer of FIG. 5a when the actuator is not energized.

FIG. 9 is a graph 110 illustrating a torque vs. position profile and a reluctance vs. position approximation for the actuators 70 described herein when the actuators are not energized. The horizontal axis shows a portion of the range of motion of the rotor 82 and shaft 92 of the actuator (about 90 degrees), while the vertical axis shows torque output in ounce-inches (scale on the left, for the torque curve) and reluctance (for the reluctance curve). On the torque scale, positive torques indicate a resistive force to motion in a particular direction, and negative torques indicate an assistive force to motion in a particular direction. The zero degree position of the rotor as referenced in the graph 110 is the rotor position shown in FIG. 5*a*, e.g. the center position of the rotor in its degree of freedom. Curve 112 shows the torque output vs. position of the actuator when the shaft is rotated. The curve 112 has been simplified for explanatory purposes. In actuality, a hysteresis effect is present, where a different torque may be present when rotating the rotor in the clockwise direction as compared to rotating the rotor in the counterclockwise direction. Friction also distorts the curve 112 from an ideal output; for example, friction contributes to the minimum point 120 being above 0 torque (frictional resistance).

Curve 112 follows a varying path, indicating that the torque output of the actuator can differ greatly depending on the position of the rotor with respect to the stator. A desired usable output range of the actuator 70 for the present invention is about 50 degrees of rotation, and physical stops are preferably provided to limit the rotor to such a range as described above. The O-degree position 120 shown in the graph corresponds to the center position of the rotor of FIG. 5*a*, and limits 114 indicate approximately a 25-degree limit on either side of the center position 120.

Since positive torque resists motion in the particular direction and negative torque assists motion in that direction, the presented range shows that the rotor is biased to the center position at 0 degrees. The torque output reaches a maximum at points 116 and 118, and then falls off, crossing the zero torque line at points 113. The limits to the actuator are provided just before points 113, where there is still a (small) resistive torque.

A reluctance curve 122 is also shown in the graph 110. Curve 122 is an approximate relative indication or generalization of the reluctance in the magnetic circuit based on the rotor position when the coils are not energized, using the same horizontal position scale as the torque curve (reluctance values are not shown). A local minimum reluctance point 124 indicates that the reluctance is low at the position of the rotor in FIG. 5*a*, and thus is a preferential position. This position of the rotor corresponds with the zero-torque point 120 of the torque output and is referred to as the local minimum reluctance position, since no magnetic reluctance is biasing the rotor in either direction at that position, i.e. it is a minimum energy position. Points 126 and 128 are local maximum reluctance points which approximately correspond to the points 113 on the torque curve 112 where the torque goes from positive to negative.

Preferably, the physical stops described with reference to FIG. 8 limit the range of the rotor approximately between the two adjacent local maximum reluctance positions 126 and 128, i.e. the range is limited between the positions where the output torque changes direction going from positive (resistive) to negative (assistive) torque, or vice-versa. This range allows the zero-torque point 120 on curve 112 and the minimum reluctance position 124 to be at or close to the center of the range of motion of the rotor. The magnetics of the actuator 70 function such that when the coils 88 are in an unenergized state (no current flowing therethrough), a spring resistance force is output to bias the rotor to the local minimum reluctance position at point 124 or 120, located between two successive (or adjacent) maximum reluctance positions 126 and 128 on curve 122.

If the position 120 is provided at or near the center of the desired range of the actuator, the opposing torque forces act similarly to centering spring forces. The centering spring force of actuator 70 can be advantageous in many force feedback interface device embodiments. For example, joysticks are often provided with a centering spring force which bias the joystick handle to a center position in each degree of freedom. However, the actuators must typically be controlled by the local microprocessor (see below) or host computer processor to output the centering spring force. Since the centering spring force of actuator 70 is present when the actuator is not energized, the computer or microprocessor need not actively control and output the centering spring force. This may decrease the processing burden of the processor in some embodiments.

Furthermore, the processor can output force by energizing the actuator to counteract the inherent centering spring force of the actuator with an energized force output. This allows no forces to be output as a net result, or allows other force sensations to be output without having the centering spring force interfering with those force sensations. The actuator can also be energized to provide a spring force having a magnitude that adds to the inherent spring force magnitude, which allows spring forces of greater magnitude to be output. This can be advantageous in many implementations due to the common use of spring forces in force feedback application programs.

The actuator 70 can be used in some embodiments such that no large centering spring force is output in an unenergized state. For example, in a preferred embodiment, approximately 5 oz-in of torque may be output when the coils are energized. The small amount of unenergized torque output shown in FIG. 9 (e.g., about 0.6 oz-in) is not significant compared to this output, and thus may not be noticeable to the user. In other embodiments, the geometry of the actuator 70 can be altered to provide a greater centering spring force that may be noticeable to the user.

In actuator 70, the profile shown in FIG. 9 is repeated throughout the full rotational range of the stator (if such a range is allowed), where each profile is 90 degrees of the rotational range. The profile is repeated due to the mechanical structure of the actuator, i.e., a magnet 96 or 98 is one-quarter of the circumference of the rotor 82 and thus causes the magnetic force interaction to repeat every 90 degrees. However, the preferred operation of the motor is limited to 50 degrees or less of rotation of the rotor 82.

Figure 10:
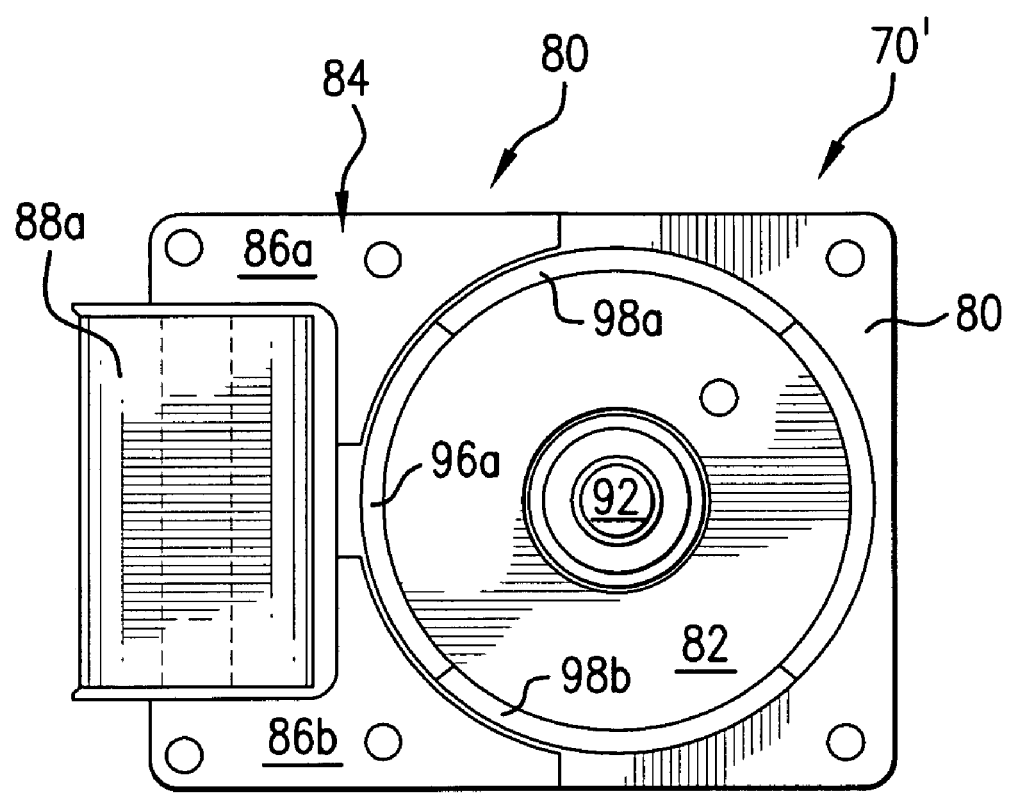
FIG. 10 is a front elevational view of an alternate embodiment of the transducer of FIG. 5.

FIG. 10 is a side elevational view of an alternate embodiment 70' of actuator 70 suitable for the present invention, in which only one coil is used. Actuator 70' is a single phase, two pole actuator having a fixed coil and a moving magnet. Stator 84 is similar to the stator 84*a* described above; however, actuator 70' needs only one stator 84. One coil 88*a* is also used as described above. The rotor 82 can be implemented similarly as described above, except that only magnet portions 96*a*, 98*a*, and 98*b* are required. Substrate 80 can provide any required support for the rotor 82 so that the rotor magnets are adjacent to the stator 86*a* and 86*b* surfaces. Actuator 70' outputs half or less of the torque magnitude of the actuator 70 due to the presence of only one coil 88 and stator 84, but is less costly to manufacture and assemble.

Figure 11:
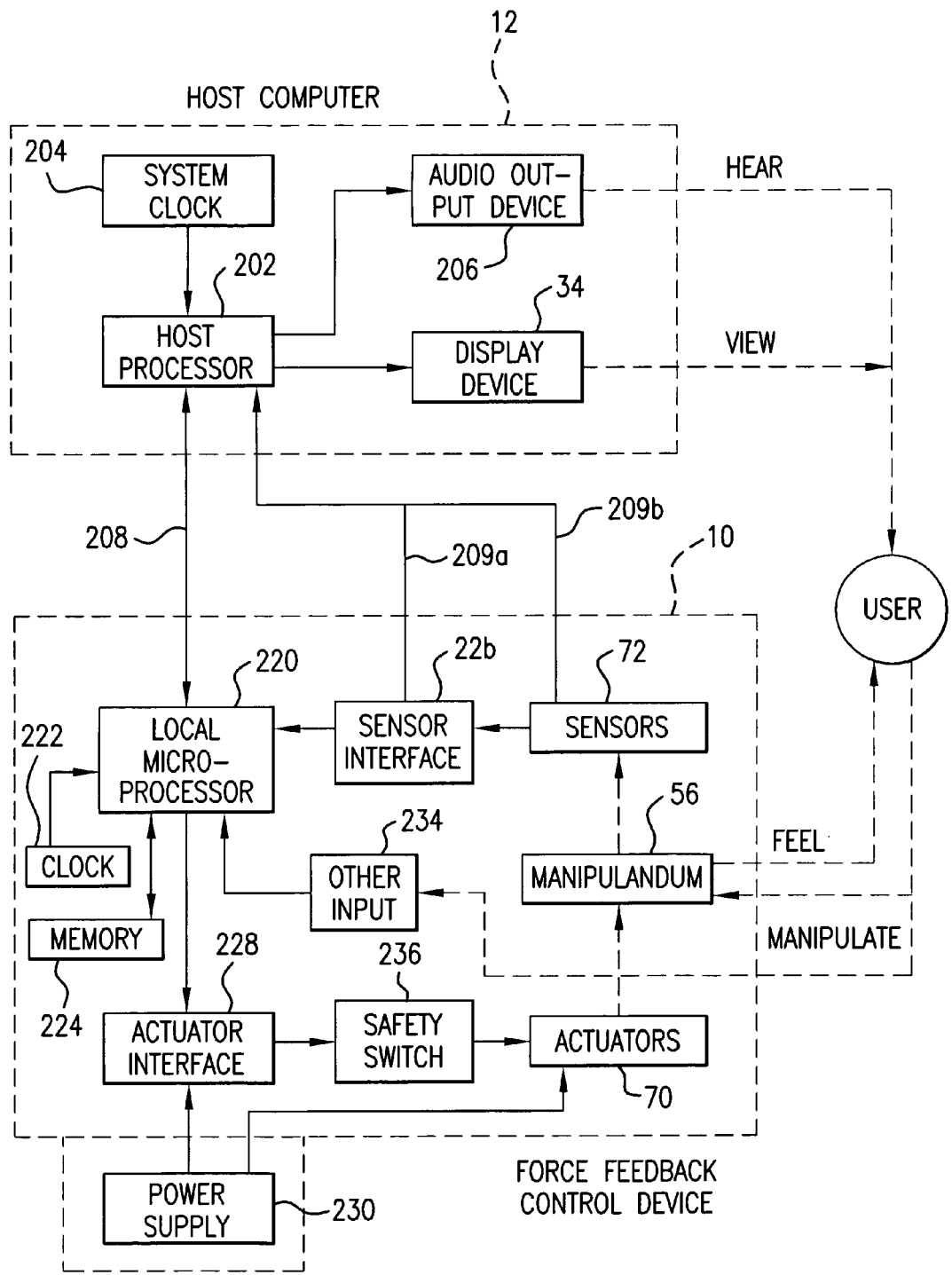
FIG. 11 is a block diagram illustrating the interface device and host computer of the present invention.

FIG. 11 is a block diagram illustrating the force feedback device 10 and host computer 12 suitable for use with the present invention. Interface device 10 can be any of the embodiments described above. A system similar to that of FIG. 11 is described in detail in U.S. Pat. No. 5,734,373 which is incorporated herein by reference in its entirety.

As explained with reference to FIG. 1*a*, host computer 12 is preferably a personal computer, workstation, video game console, or other computing or display device. Host computer 12 commonly includes a host microprocessor 202, a clock 204, a display device 34, and an audio output device 206. Host microprocessor 202 can include a variety of available microprocessors from Intel, AMD, Motorola, or other manufacturers. Microprocessor 202 can be single microprocessor chip, or can include multiple primary and/or co-processors and preferably retrieves and stores instructions and other necessary data from random access memory (RAM) and read-only memory (ROM) as is well known to those skilled in the art. In the described embodiment, host computer 12 can receive sensor data or a sensor signal via bus 208 from sensors of device 10 and other information. Microprocessor 202 can receive data from bus 208 using I/O electronics, and can use the I/O electronics to control other peripheral devices. Host computer system 12 can also output commands to interface device 10 via bus 208 to cause force feedback.

Clock 204 can be a standard clock crystal or equivalent component used by host computer 12 to provide timing to electrical signals used by host microprocessor 202 and other components of the computer 12 and can be used to provide timing information that may be necessary in determining force or position values. Display device 34 is described with reference to FIG. 1*a*. Audio output device 206, such as speakers, can be coupled to host microprocessor 202 via amplifiers, filters, and other circuitry well known to those skilled in the art. Other types of peripherals can also be coupled to host processor 202, such as storage devices (hard disk drive, CD ROM drive, floppy disk drive, etc.), printers, and other input and output devices.

Interface device 10 is coupled to host computer 12 by bi-directional bus 208, which sends signals in either direction between host computer 12 and the interface device 10. Bus 208 can be a serial interface bus, such as USB, RS-232, or Firewire (IEEE 1394), providing data according to a serial communication protocol, a parallel bus using a parallel protocol, or other types of buses. An interface port of host computer 12, such as a USB or RS232 serial interface port, can connect bus 208 to host computer 12.

Interface device 10 can include a local microprocessor 220, local clock 222, local memory 224, sensor interface 226, and actuator interface 228. Device 10 may also include additional electronic components for communicating via standard protocols on bus 208.

Local microprocessor 220 preferably coupled to bus 208 and is considered "local" to device 10, where "local" herein refers to processor 220 being a separate microprocessor from any processors 202 in host computer 12. "Local" also preferably refers to processor 220 being dedicated to haptic feedback and sensor I/O of the device 10, and being closely coupled to sensors and actuators of the device 10, such as within the housing 14 or 42. Microprocessor 220 can be provided with software instructions to wait for commands or requests from computer host 12, parse/decode the command or request, and handle/control input and output signals according to the command or request. In addition, processor 220 can operate independently of host computer 12 by reading sensor signals and calculating appropriate forces from those sensor signals, time signals, and force processes selected in accordance with a host command, and outputting appropriate control signals to the actuators. Suitable microprocessors for use as local microprocessor 220 include the 8X930AX by Intel, the MC68HC711E9 by Motorola or the PIC16C74 by Microchip, for example. Microprocessor 220 can include one microprocessor chip, or multiple processors and/or co-processor chips. In other embodiments, microprocessor 220 can include digital signal processor (DSP) functionality, or be implemented as control logic components or hardware state machine instead of an actual microprocessor chip.

For example, in one host-controlled embodiment that utilizes microprocessor 220, host computer 12 can provide low-level force commands over bus 208, which microprocessor 220 directly transmits to the actuators. In a different local control embodiment, host computer 12 provides high level supervisory commands to microprocessor 220 over bus 208, and microprocessor 220 manages low level force control loops to sensors and actuators in accordance with the high level commands and independently of the host computer 12. In the local control embodiment, the microprocessor 220 can process sensor signals to determine appropriate output actuator signals by following the instructions of a "force process" that may be stored in local memory 224 and includes calculation instructions, conditions, formulas, force magnitudes, or other data. The force process can command distinct force sensations, such as vibrations, textures, jolts, or even simulated interactions between displayed objects. The host can send the local processor 220 a spatial layout of objects in the graphical environment so that the microprocessor has a mapping of locations of graphical objects and can determine force interactions locally. Force feedback used in such embodiments is described in greater detail in co-pending patent application Ser. No. 08/879,296 and U.S. Pat. No. 5,734,373, both of which are incorporated by reference herein.

A local clock 222 can be coupled to the microprocessor 220 to provide timing data, similar to system clock 204 of host computer 12; the timing data might be required, for example, to compute forces output by actuators 70. Local memory 224, such as RAM and/or ROM, is preferably coupled to microprocessor 220 to store instructions for microprocessor 220 and store temporary and other data.

Sensor interface 226 may optionally be included in device 10 to convert sensor signals to signals that can be interpreted by the microprocessor 220 and/or host computer 12. For example, sensor interface 226 can receive and convert signals from a digital sensor such as an encoder or from an analog sensor using an analog to digital converter (ADC). Such circuits, or equivalent circuits, are well known to those skilled in the art. Alternately, microprocessor 220 or host computer 12 can perform these interface functions. Actuator interface 228 can be optionally connected between the actuators of device 10 and microprocessor 220 to convert signals from microprocessor 220 into signals appropriate to drive the actuators. Interface 228 can include power amplifiers, switches, digital to analog controllers (DACs), and other components well known to those skilled in the art. Power supply 230 can optionally be coupled to actuator interface 228 and/or the actuators 70 to provide electrical power. Alternatively, actuators and other components can draw power from the bus 208 (such as USB) from the host computer. Or, power can be stored and regulated by device 10 and used when needed to drive actuators 70.

Sensors 72 sense the position, motion, and/or other characteristics of particular controls of device 10 as described above. Sensors 72 provide signals to microprocessor 220 including information representative of those characteristics. The sensor 72 or sensor interface 226 can optionally provide sensor signals directly to computer 12 as shown by busses 209a and 209b. Example of sensors suitable for embodiments described herein are digital rotary optical encoders, Hall effect sensors, linear optical encoders, analog sensors such as potentiometers, optical sensors such as a lateral effect photo diode, velocity sensors (e.g., tachometers) and/or acceleration sensors (e.g., accelerometers). Furthermore, either relative or absolute sensors can be employed.

Actuators 70 transmit forces to particular controls of device 10 in one or more directions along one or more degrees of freedom in response to signals output by microprocessor 220 and/or host computer 12, i.e., they are "computer controlled." Actuators 70 are described in greater detail above. In some embodiments of the present invention, passive actuators can be used apply a resistance to the motion of the manipulandum 56, such as magnetic particle brakes, friction brakes, or pneumatic/hydraulic passive actuators.

The manipulandum 56 can be a variety of different objects or manipulandums that are manipulated by a user and which can receive force feedback. For example, manipulandum 56 can be the sphere or finger joystick described above. The housing of the entire device 10 can also be actuated.

Other input devices 234 can optionally be included in device 10 and send input signals to microprocessor 220 and/or host computer 12. Such input devices can include buttons, dials, knobs, switches, voice recognition hardware (with software implemented by host 12), or other input mechanisms as described above. Safety or "deadman" switch 236 can be included in some embodiments of device 10 to provide a mechanism to allow a user to override and deactivate forces output by actuators 70, or require a user to activate actuators 70, for safety reasons. For example, the user can be required to continually activate or close safety switch 236 during manipulation of the device 10 to activate the actuators 70. Embodiments of safety switch 236 include an optical safety switch, electrostatic contact switch, hand weight safety switch, etc.

While this invention has been described in terms of several preferred embodiments, it is contemplated that alterations, permutations, and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations and equivalents as fall within the true spirit and scope of the present invention.

What is claimed is:

1. A force feedback device for inputting control signals to a computer and for outputting force comprising:
   a manipulandum manipulable in at least two degrees of freedom; and
   at least one actuator coupled to said manipulandum, said actuator configured to provide torque to said manipulandum in an unenergized state, said actuator having a plurality of coils, all of said plurality of coils operated in the same magnitude and direction.

2. A device as recited in claim 1, wherein said at least one actuator comprises four permanent magnetic poles and four electromagnetic poles.

3. A device as recited in claim 1, wherein said manipulandum is configured to have a center position, and wherein a centering spring force is operable to bias said manipulandum toward said center position.

4. A device as recited in claim 1, wherein said manipulandum comprises a support element provided with a contact surface.

5. A device as recited in claim 1 wherein said manipulandum comprises a partial sphere.

6. A device as recited in claim 1, further comprising a gimbal mechanism configured to provide said at least two degrees of freedom to said manipulandum.

7. A device as recited in claim 6, wherein said gimbal mechanism comprises a five-bar closed loop linkage.

8. A device as recited in claim 1, further comprising a handheld housing configured to house said manipulandum and said actuator.

9. A device as recited in claim 1 further comprising at least one sensor coupled to said manipulandum configured to detect a position of said manipulandum in at least one of said degrees of freedom and to output a sensor signal indicative of said position, wherein said sensor comprises an optical encoder.

10. A device as recited in claim 9, wherein said sensor comprises an encoder member rigidly coupled to a rotor of said actuator, said encoder member comprising at least one encoder pattern.

11. A device as recited in claim 1, wherein said actuator comprises a rotor, said rotor comprising two magnets in at least a partially cylindrical shape.

12. A device as recited in claim 1 wherein said manipulandum comprises a joystick.

13. A device as recited in claim 1 wherein said manipulandum comprises a dial.

14. A device as recited in claim 1 wherein said angular range comprises approximately 50 degrees.

15. A device as recited in claim 1, wherein said actuator comprises a rotating shaft.

16. A force feedback device for inputting control signals to a computer and for outputting force comprising:
a housing;
a manipulandum manipulable in at least two degrees of freedom;
at least one sensor configured to output at least one sensor signal indicative of a position of said manipulandum in at least one of said degrees of freedom; and
at least one actuator coupled to said manipulandum, said actuator operable in an unenergized state to provide torque to said manipulandum, said actuator having a plurality of coils, all of said plurality of coils operated in the same magnitude and direction.

17. A device as recited in claim 16 wherein said manipulandum is configured to have a center position, and wherein a centering spring force biases said manipulandum toward said center position.

18. A device as recited in claim 16, wherein said actuator comprises four permanent magnetic poles and four electromagnetic poles.

19. A device as recited in claim 16, wherein said manipulandum comprises a support element, said support element comprising a contact surface.

20. A device as recited in claim 16, wherein said manipulandum comprises a sphere.

21. A device as recited in claim 16, further comprising a gimbal mechanism coupled between said at least one actuator and said manipulandum, said gimbal mechanism operable to provide said at least two degrees of freedom to said manipulandum.

22. A device as recited in claim 21, wherein said gimbal mechanism comprises a five-bar closed loop linkage.

23. A device as recited in claim 16, further comprising a handheld gamepad, said handheld gamepad comprising said manipulandum and said actuator.

24. A device as recited in claim 16, wherein said sensor comprises an optical encoder.

25. A device as recited in claim 24, wherein said actuator comprises a rotor and said sensor comprises an encoder member rigidly coupled to said rotor of said actuator, said encoder member comprising at least one encoder pattern.

26. A device as recited in claim 25, wherein said sensor comprises a reticle positioned between said encoder member and an emitter, said reticle comprising a pattern similar to said encoder pattern.

27. A device as recited in claim 25, wherein said sensor comprises at least four detectors configured to provide signals about 45 degrees out of phase with each other.

28. A device as recited in claim 16, wherein said actuator comprises a rotor, said rotor comprising two magnets in at least a partially cylindrical shape.

29. A device as recited in claim 16, further comprising a processor coupled to said sensor and to said actuator, said processor operable to control programmable forces output on said manipulandum.

30. A method for providing a force feedback device for inputting control signals to a computer and for outputting force comprising:
providing a housing;
providing a manipulandum manipulable in at least two degrees of freedom; and
providing at least one actuator operable in an unenergized state to provide torque to said manipulandum, said actuator having a plurality of coils, all of said plurality of coils operated in the same magnitude and direction.

31. A method as recited in claim 30 further comprising providing to said manipulandum a center position, wherein a centering force biases said manipulandum toward said center position.

32. A method as recited in claim 30, wherein said actuator comprises four permanent magnetic poles and four electromagnetic poles.

33. A method as recited in claim 30 further comprising using a gimbal mechanism for providing said at least two degrees of freedom to said manipulandum.

34. A method as recited in claim 30 wherein said manipulandum is in the form of a handheld gamepad.

35. A method as recited in claim 30 wherein a rotor of said actuator includes two magnets in at least a partially cylindrical shape.

36. A method as recited in claim 30 wherein said actuator is a brushless, single phase actuator.

37. A method as recited in claim 30, wherein said actuator comprises a grounded excitation coil.

* * * * *